(12) United States Patent
Peng et al.

(10) Patent No.: US 12,526,237 B2
(45) Date of Patent: Jan. 13, 2026

(54) SYSTEM AND METHOD FOR DETERMINING FLOW SPECIFICATION RULES FOR COMMUNICATION PACKETS

(71) Applicant: Huawei Technologies Co., Ltd., Shenzhen (CN)

(72) Inventors: Shuping Peng, Beijing (CN); Sheng Fang, Beijing (CN); Shunwan Zhuang, Beijing (CN); Haibo Wang, Beijing (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 18/606,443

(22) Filed: Mar. 15, 2024

(65) Prior Publication Data

US 2024/0223504 A1 Jul. 4, 2024

Related U.S. Application Data

(63) Continuation of application No. PCT/CN2022/117655, filed on Sep. 7, 2022.

(30) Foreign Application Priority Data

Sep. 16, 2021 (CN) .......................... 202111086203.3
Oct. 25, 2021 (CN) .......................... 202111243501.9

(51) Int. Cl.
*G06F 15/16* (2006.01)
*H04L 47/2425* (2022.01)

(52) U.S. Cl.
CPC ................................ *H04L 47/2425* (2013.01)

(58) Field of Classification Search
CPC ... H04L 47/2425; H04L 45/38; H04L 45/745; H04L 45/76; H04L 47/24; H04L 47/2441
See application file for complete search history.

(56) References Cited

U.S. PATENT DOCUMENTS

| 11,575,606 B2 * | 2/2023 | Wu ..................... H04L 63/0236 |
| 2001/0043610 A1 * | 11/2001 | Nemirovsky ........... H04L 47/32 |
| | | 370/412 |

(Continued)

FOREIGN PATENT DOCUMENTS

CN 109510776 A 3/2019

OTHER PUBLICATIONS

S. Deering et al, "Internet Protocol, Version 6 (IPv6) Specification", Internet Engineering Task Force (IETF) RFC8200, Jul. 2017, total 42 pages.

(Continued)

*Primary Examiner* — Razu A Miah
(74) *Attorney, Agent, or Firm* — SLATER MATSIL, LLP

(57) ABSTRACT

A method, in which a first network device obtains a first service packet and a plurality of flow specification FlowSpec rule groups, where any FlowSpec rule group in the plurality of FlowSpec rule groups indicates a rule set for processing a service packet, and different FlowSpec rule groups correspond to different priorities. The first network device determines a target FlowSpec rule group, where the target FlowSpec rule group is a FlowSpec rule group in the plurality of FlowSpec rule groups that successfully matches the first service packet and that has the highest priority. The first network device processes the first service packet according to the target FlowSpec rule group. A service packet is processed according to a FlowSpec rule group, so that processing efficiency can be improved.

20 Claims, 12 Drawing Sheets

(56) References Cited

U.S. PATENT DOCUMENTS

| | | | |
|---|---|---|---|
| 2003/0135603 A1* | 7/2003 | Lin .................. | H04L 63/02 |
| | | | 709/231 |
| 2015/0146718 A1* | 5/2015 | Wang ................ | H04L 45/52 |
| | | | 370/389 |
| 2017/0207996 A1* | 7/2017 | Lui .................. | H04L 41/083 |
| 2017/0339109 A1* | 11/2017 | Zeng ................ | H04L 63/166 |
| 2018/0262434 A1* | 9/2018 | Koponen ........... | H04L 45/64 |
| 2019/0028381 A1* | 1/2019 | Li .................. | H04L 69/03 |
| 2019/0104060 A1* | 4/2019 | Wang ................ | H04L 45/54 |
| 2019/0199642 A1* | 6/2019 | Jiang ................ | H04L 47/10 |
| 2021/0184974 A1* | 6/2021 | Wu .................. | H04L 45/64 |
| 2021/0258251 A1* | 8/2021 | Eastlake, III ....... | H04L 45/74 |
| 2021/0409316 A1* | 12/2021 | Seshan .............. | H04L 49/3063 |

OTHER PUBLICATIONS

S. Hares et al, "BGP Flow Specification Version 2 draft-hares-idr-flowspec-v2-02",IDR Working Group Intended status: Standards Track, Jul. 26, 2021, total 22 pages,XP015147146.

C. Loibl et al, "RFC 8955 Dissemination of Flow Specification Rules", RFC8955, Dec. 2020, total 36 pages.

J. Haas et al, "BGP Flowspec Explicit Term Ordering draft-haas-idr-flowspec-term-order-00", Inter-Domain Routing Intended status: Standards Track, Apr. 27, 2021, total 7 pages, XP015145539.

C. Loibl, Ed et al, "RFC 8956 Dissemination of Flow Specification Rules for IPV6", RFC8956, Dec. 2020, total 19 pages.

* cited by examiner

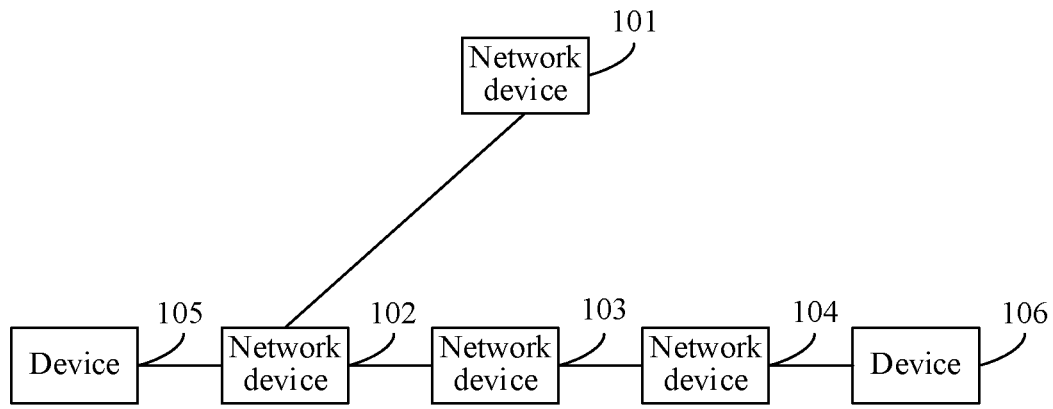

FIG. 1

```
+ - - - - - - - - - - - - - - - - - - +
|    Length (Length) (0xnn or 0xfnnn)  |
+ - - - - - - - - - - - - - - - - - - +
|       NLRI value (value) (variable)  |
+ - - - - - - - - - - - - - - - - - - +
```

FIG. 2

```
+-+-+-+-+-+-+-+-+-+-+-+-+-+-+-+-+-+-+-+-+-+-+-+-+-+-+-+-+-+-+-+-+
| SLA level (Level) |    APP ID    |  User (User) ID  | Flow (Flow) ID |
+-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
| SLA level (Level)|  APP ID  | User (User) ID | Flow (Flow) ID | Arguments (Arguments) |
+-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
| Locator Address (Locator Address) | Function (Function) ID | Arguments (Arguments) |
+-+-+-+-+-+-+-+-+-+-+-+-+-+-+-+-+-+-+-+-+-+-+-+-+-+-+-+-+-+-+-+-+
```

FIG. 3

Group identifier (Group ID) = 1

```
+-+-+-+-+-+-+-+-+    +-+-+-+-+-+-+-+-+-+-+-+-+-+-+-+-+
| Rule (5-tuple) |   |         App Group ID          |
+-+-+-+-+-+-+-+-+    +-+-+-+-+-+-+-+-+-+-+-+-+-+-+-+-+

+-+-+-+-+-+-+-+-+    +-+-+-+-+-+-+-+-+-+-+-+-+-+-+-+-+
| Rule (5-tuple) |   |         App Group ID          |
+-+-+-+-+-+-+-+-+    +-+-+-+-+-+-+-+-+-+-+-+-+-+-+-+-+

+-+-+-+-+-+-+-+-+    +-+-+-+-+-+-+-+-+-+-+-+-+-+-+-+-+
| Rule (5-tuple) |   |         App Group ID          |
+-+-+-+-+-+-+-+-+    +-+-+-+-+-+-+-+-+-+-+-+-+-+-+-+-+

+-+-+-+-+-+-+-+-+    +-+-+-+-+-+-+-+-+-+-+-+-+-+-+-+-+
| Rule (5-tuple) |   |          R. Group ID          |
+-+-+-+-+-+-+-+-+    +-+-+-+-+-+-+-+-+-+-+-+-+-+-+-+-+

+-+-+-+-+-+-+-+-+    +-+-+-+-+-+-+-+-+-+-+-+-+-+-+-+-+
| Rule (5-tuple) |   |          R. Group ID          |
+-+-+-+-+-+-+-+-+    +-+-+-+-+-+-+-+-+-+-+-+-+-+-+-+-+
       ...                          ...
+-+-+-+-+-+-+-+-+    +-+-+-+-+-+-+-+-+-+-+-+-+-+-+-+-+
| Rule (5-tuple) |   |          R. Group ID          |
+-+-+-+-+-+-+-+-+    +-+-+-+-+-+-+-+-+-+-+-+-+-+-+-+-+
=================================================================
```

Group identifier (Group ID) = 0

```
+-+-+-+-+-+-+-+-+    +-+-+-+-+-+-+-+-+-+-+-+-+-+-+-+-+
| Rule (5-tuple) |   |         App Group ID          |
+-+-+-+-+-+-+-+-+    +-+-+-+-+-+-+-+-+-+-+-+-+-+-+-+-+

+-+-+-+-+-+-+-+-+    +-+-+-+-+-+-+-+-+-+-+-+-+-+-+-+-+
| Rule (5-tuple) |   |         App Group ID          |
+-+-+-+-+-+-+-+-+    +-+-+-+-+-+-+-+-+-+-+-+-+-+-+-+-+
       ...                          ...
+-+-+-+-+-+-+-+-+    +-+-+-+-+-+-+-+-+-+-+-+-+-+-+-+-+
| Rule (5-tuple) |   |         App Group ID          |
+-+-+-+-+-+-+-+-+    +-+-+-+-+-+-+-+-+-+-+-+-+-+-+-+-+
```

FIG. 4

Group identifier (Group ID) = 1, sub-group identifier
(Sub-Group ID) = 1

```
+-+-+-+-+-+-+-+-+      +-+-+-+-+-+-+-+-+-+-+-+-+-+-+-+-+
| Rule (5-tuple) |     |         App Group ID          |
+-+-+-+-+-+-+-+-+      +-+-+-+-+-+-+-+-+-+-+-+-+-+-+-+-+

+-+-+-+-+-+-+-+-+      +-+-+-+-+-+-+-+-+-+-+-+-+-+-+-+-+
| Rule (5-tuple) |     |         App Group ID          |
+-+-+-+-+-+-+-+-+      +-+-+-+-+-+-+-+-+-+-+-+-+-+-+-+-+
       ...                            ...
+-+-+-+-+-+-+-+-+      +-+-+-+-+-+-+-+-+-+-+-+-+-+-+-+-+
| Rule (5-tuple) |     |         App Group ID          |
+-+-+-+-+-+-+-+-+      +-+-+-+-+-+-+-+-+-+-+-+-+-+-+-+-+
```
- - - - - - - - - - - - - - - - - - - - - -

Group ID = 1, Sub-Group ID = 2

```
+-+-+-+-+-+-+-+-+      +-+-+-+-+-+-+-+-+-+-+-+-+-+-+-+-+
| Rule ( ports ) |     |         User Group ID         |
+-+-+-+-+-+-+-+-+      +-+-+-+-+-+-+-+-+-+-+-+-+-+-+-+-+

+-+-+-+-+-+-+-+-+      +-+-+-+-+-+-+-+-+-+-+-+-+-+-+-+-+
| Rule ( ports ) |     |         User Group ID         |
+-+-+-+-+-+-+-+-+      +-+-+-+-+-+-+-+-+-+-+-+-+-+-+-+-+
       ...                            ...
+-+-+-+-+-+-+-+-+      +-+-+-+-+-+-+-+-+-+-+-+-+-+-+-+-+
| Rule ( ports ) |     |         User Group ID         |
+-+-+-+-+-+-+-+-+      +-+-+-+-+-+-+-+-+-+-+-+-+-+-+-+-+
```
- - - - - - - - - - - - - - - - - - - - - -

Group ID = 1, Sub-Group ID = 3

```
+-+-+-+-+-+-+-+-+      +-+-+-+-+-+-+-+-+-+-+-+-+-+-+-+-+
| Rule (5-tuple) |     |          R. Group ID          |
+-+-+-+-+-+-+-+-+      +-+-+-+-+-+-+-+-+-+-+-+-+-+-+-+-+

+-+-+-+-+-+-+-+-+      +-+-+-+-+-+-+-+-+-+-+-+-+-+-+-+-+
| Rule (5-tuple) |     |          R. Group ID          |
+-+-+-+-+-+-+-+-+      +-+-+-+-+-+-+-+-+-+-+-+-+-+-+-+-+
       ...                            ...
+-+-+-+-+-+-+-+-+      +-+-+-+-+-+-+-+-+-+-+-+-+-+-+-+-+
| Rule (5-tuple) |     |          R. Group ID          |
+-+-+-+-+-+-+-+-+      +-+-+-+-+-+-+-+-+-+-+-+-+-+-+-+-+
```

FIG. 5

```
                Group ID = 1,  Sub-Group ID = 1
+-+-+-+-+-+-+-+-+-+       +-+-+-+-+-+-+-+-+-+-+-+-+-+-+-+-+-+
| Rule (5-tuple)  |       |           App Group ID          |
+-+-+-+-+-+-+-+-+-+       +-+-+-+-+-+-+-+-+-+-+-+-+-+-+-+-+-+

+-+-+-+-+-+-+-+-+-+       +-+-+-+-+-+-+-+-+-+-+-+-+-+-+-+-+-+
| Rule (5-tuple)  |       |           App Group ID          |
+-+-+-+-+-+-+-+-+-+       +-+-+-+-+-+-+-+-+-+-+-+-+-+-+-+-+-+
        ...                               ...
+-+-+-+-+-+-+-+-+-+       +-+-+-+-+-+-+-+-+-+-+-+-+-+-+-+-+-+
| Rule (5-tuple)  |       |           App Group ID          |
+-+-+-+-+-+-+-+-+-+       +-+-+-+-+-+-+-+-+-+-+-+-+-+-+-+-+-+
 ─ ─ ─ ─ ─ ─ ─ ─ ─ ─ ─ ─ ─ ─ ─ ─ ─ ─ ─ ─ ─ ─ ─ ─
                Group ID = 1, Sub-Group ID = 2
+-+-+-+-+-+-+-+-+-+       +-+-+-+-+-+-+-+-+-+-+-+-+-+-+-+-+-+
| Rule ( ports )  |       |           User Group ID         |
+-+-+-+-+-+-+-+-+-+       +-+-+-+-+-+-+-+-+-+-+-+-+-+-+-+-+-+

+-+-+-+-+-+-+-+-+-+       +-+-+-+-+-+-+-+-+-+-+-+-+-+-+-+-+-+
| Rule ( ports )  |       |           User Group ID         |
+-+-+-+-+-+-+-+-+-+       +-+-+-+-+-+-+-+-+-+-+-+-+-+-+-+-+-+
        ...                               ...
+-+-+-+-+-+-+-+-+-+       +-+-+-+-+-+-+-+-+-+-+-+-+-+-+-+-+-+
| Rule ( ports )  |       |           User Group ID         |
+-+-+-+-+-+-+-+-+-+       +-+-+-+-+-+-+-+-+-+-+-+-+-+-+-+-+-+
 ─ ─ ─ ─ ─ ─ ─ ─ ─ ─ ─ ─ ─ ─ ─ ─ ─ ─ ─ ─ ─ ─ ─ ─
                Group ID = 1, Sub-Group ID = 3
+-+-+-+-+-+-+-+-+-+       +-+-+-+-+-+-+-+-+-+-+-+-+-+-+-+-+-+
| Rule (5-tuple)  |       |            R. Group ID          |
+-+-+-+-+-+-+-+-+-+       +-+-+-+-+-+-+-+-+-+-+-+-+-+-+-+-+-+

+-+-+-+-+-+-+-+-+-+       +-+-+-+-+-+-+-+-+-+-+-+-+-+-+-+-+-+
| Rule (5-tuple)  |       |            R. Group ID          |
+-+-+-+-+-+-+-+-+-+       +-+-+-+-+-+-+-+-+-+-+-+-+-+-+-+-+-+
        ...                               ...
+-+-+-+-+-+-+-+-+-+       +-+-+-+-+-+-+-+-+-+-+-+-+-+-+-+-+-+
| Rule (5-tuple)  |       |            R. Group ID          |
+-+-+-+-+-+-+-+-+-+       +-+-+-+-+-+-+-+-+-+-+-+-+-+-+-+-+-+
===================================================================
                Group ID = 0, Sub-Group ID = 0
+-+-+-+-+-+-+-+-+-+       +-+-+-+-+-+-+-+-+-+-+-+-+-+-+-+-+-+
| Rule (5-tuple)  |       |           App Group ID          |
+-+-+-+-+-+-+-+-+-+       +-+-+-+-+-+-+-+-+-+-+-+-+-+-+-+-+-+

+-+-+-+-+-+-+-+-+-+       +-+-+-+-+-+-+-+-+-+-+-+-+-+-+-+-+-+
| Rule (5-tuple)  |       |           App Group ID          |
+-+-+-+-+-+-+-+-+-+       +-+-+-+-+-+-+-+-+-+-+-+-+-+-+-+-+-+
        ...                               ...
+-+-+-+-+-+-+-+-+-+       +-+-+-+-+-+-+-+-+-+-+-+-+-+-+-+-+-+
| Rule (5-tuple)  |       |           App Group ID          |
+-+-+-+-+-+-+-+-+-+       +-+-+-+-+-+-+-+-+-+-+-+-+-+-+-+-+-+
```

FIG. 6

SYSTEM AND METHOD FOR DETERMINING FLOW SPECIFICATION RULES FOR COMMUNICATION PACKETS

CROSS-REFERENCE TO RELATED APPLICATIONS

This application is a continuation of International Application No. PCT/CN2022/117655, filed on Sep. 7, 2022, which claims priority to Chinese Patent Application No. 202111086203.3, filed on Sep. 16, 2021 and Chinese Patent Application No. 202111243501.9, filed on Oct. 25, 2021. All of the aforementioned patent applications are hereby incorporated by reference in their entireties

TECHNICAL FIELD

This application relates to the field of communications technologies, and in particular, to a packet processing method, a flow specification transmission method, a device, a system, and a storage medium.

BACKGROUND

With development of communications technologies, requirements for processing service packets keep increasing in number. A flow specification (FlowSpec) can be used to process service packets. The FlowSpec is an N-tuple, and includes a plurality of rules and actions corresponding to the rules.

SUMMARY

This application provides a packet processing method, a flow specification transmission method, a device, a system, and a storage medium, to improve management efficiency of rules and processing efficiency of service packets.

According to a first aspect, a packet processing method is provided. An example in which a first network device performs the method is used. The method includes: The first network device obtains a first service packet and a plurality of flow specification FlowSpec rule groups, where any FlowSpec rule group in the plurality of FlowSpec rule groups indicates a rule set for processing a service packet, and different FlowSpec rule groups correspond to different priorities. The first network device determines a target FlowSpec rule group, where the target FlowSpec rule group is a FlowSpec rule group in the plurality of FlowSpec rule groups that successfully matches the first service packet and that has the highest priority. The first network device processes the first service packet according to the target FlowSpec rule group.

A FlowSpec rule group indicates a rule set for processing a service packet, and different FlowSpec rule groups correspond to different priorities. A target FlowSpec rule group used for processing a service packet is determined based on a priority of a FlowSpec rule group, so that a rule corresponding to a service packet can be matched and applied to a specific action in an expected order, a hierarchical relationship exists between rules, and a hierarchical structure between rules is enriched. This improves management efficiency of rules and matching efficiency of rules, and improves processing efficiency of service packets.

In a possible implementation, the determining a target FlowSpec rule group includes: sorting the plurality of FlowSpec rule groups based on priorities of the FlowSpec rule groups, and matching the first service packet against a corresponding FlowSpec rule group in a sorted order until the target FlowSpec rule group that is successfully matched is determined. The plurality of FlowSpec rule groups are sorted based on priorities of the FlowSpec rule groups, so that after the target FlowSpec rule group is matched in a sorted order, matching is stopped, to avoid a resource waste.

In a possible implementation, the any FlowSpec rule group includes a rule in the rule set. Because the FlowSpec rule group directly includes a rule in the rule set, the rule may be directly managed by using the FlowSpec rule group.

In a possible implementation, that a first network device obtains a plurality of FlowSpec rule groups includes: receiving a plurality of rules of a flow specification FlowSpec and first indication information corresponding to the rules that are sent by a second network device, where rules corresponding to same first indication information belong to a same FlowSpec rule group; and grouping the rules based on the first indication information corresponding to the rules, to obtain the plurality of FlowSpec rule groups. The first indication information is sent together with the rule. Because the first indication information can indicate the FlowSpec rule group, the second network device can quickly determine, based on the first indication information, a FlowSpec rule group to which the rule belongs.

In a possible implementation, the target FlowSpec rule group corresponds to a plurality of FlowSpec rule sub-groups, and one FlowSpec rule sub-group indicates at least one rule in the rule set. The FlowSpec rule group is further subdivided into FlowSpec rule sub-groups, to implement more refined management on the flow specification by using the FlowSpec rule sub-groups.

In a possible implementation, the FlowSpec rule sub-group includes at least one rule in the rule set, and that a first network device obtains a plurality of FlowSpec rule groups includes: receiving a plurality of rules of a flow specification FlowSpec and first indication information and second indication information corresponding to the rules that are sent by a second network device, where rules corresponding to same first indication information belong to a same FlowSpec rule group, and rules corresponding to same second indication information in a same FlowSpec rule group belong to a same FlowSpec rule sub-group; grouping the rules based on the first indication information corresponding to the rules, to obtain the plurality of FlowSpec rule groups; and for any FlowSpec rule group, grouping rules in the any FlowSpec rule group into at least one FlowSpec rule sub-group based on second indication information corresponding to the rules in the any FlowSpec rule group. The first indication information and the second indication information are sent together when the rule is sent. Because the first indication information can indicate a FlowSpec rule group, and the second indication information can indicate a FlowSpec rule sub-group, the second network device can quickly determine, based on the first indication information and the second indication information, a FlowSpec rule sub-group that is in a FlowSpec rule group and to which the rule belongs.

In a possible implementation, the any FlowSpec rule group includes first indication information, and the first indication information corresponds to a rule in the rule set. Because the FlowSpec rule group includes the first indication information corresponding to the rules in the rule set, rules belonging to a same FlowSpec rule group may be managed by using the first indication information.

In a possible implementation, the target FlowSpec rule group further includes a plurality of FlowSpec rule sub-groups, one FlowSpec rule sub-group includes one piece of second indication information, one FlowSpec rule sub-group indicates at least one rule in the rule set, and the second indication information corresponds to the rules indicated by the FlowSpec rule sub-group to which the second indication information belongs. Because the FlowSpec rule group includes a plurality of FlowSpec rule sub-groups, and the FlowSpec rule sub-group includes second indication information corresponding to rules indicated by the FlowSpec rule sub-group, rules belonging to a same FlowSpec rule sub-group may be managed by using the second indication information.

In a possible implementation, second indication information corresponding to the any rule is a sub-group identifier of a FlowSpec rule sub-group to which the any rule belongs.

In a possible implementation, first indication information corresponding to any rule is a group identifier of a FlowSpec rule group to which the any rule belongs, and different group identifiers correspond to different priorities.

In a possible implementation, that the first network device processes the first service packet according to the target FlowSpec rule group includes: determining a target rule from a rule set indicated by the target FlowSpec rule group, and processing the first service packet based on an action corresponding to the target rule. After the target FlowSpec rule group is determined, the target rule used for processing the first service packet may be determined in the target FlowSpec rule group, to improve matching efficiency of rules and processing efficiency of service packets.

In a possible implementation, the determining a target rule from a rule set indicated by the target FlowSpec rule group includes: based on that the target FlowSpec rule group includes a plurality of FlowSpec rule sub-groups, matching the first service packet against the rules indicated by each FlowSpec rule sub-group, and using a rule that is successfully matched as the target rule. When the FlowSpec rule sub-groups are obtained through division, rule matching is performed in an order of the FlowSpec rule sub-groups, so that a matching operation is performed in a finer-grained sequence, and management of a flow specification is more refined.

In a possible implementation, each FlowSpec rule sub-group corresponds to one identifier, and the matching the first service packet against the rules indicated by each FlowSpec rule sub-group includes: matching the first service packet against the rules indicated by any FlowSpec rule sub-group in the target FlowSpec rule group, and in response to that an identifier corresponding to the any FlowSpec rule sub-group has a first value, after a rule that is successfully matched is hit in the rules indicated by the any FlowSpec rule sub-group, terminating a matching operation in the any FlowSpec rule sub-group, and matching the first service packet against the rules indicated by a next FlowSpec rule sub-group; and in response to that the identifier corresponding to the any FlowSpec rule sub-group has a second value, after a rule that is successfully matched is hit in the rules indicated by the any FlowSpec rule sub-group, continuing to perform a matching operation in the any FlowSpec rule sub-group until matching operations have been performed on all the rules indicated by the any FlowSpec rule sub-group, and then matching the first service packet against the rules indicated by a next FlowSpec rule sub-group. Optionally, an identifier of the FlowSpec rule sub-group and a value of the identifier may be configured in advance.

In a possible implementation, the matching the first service packet against the rules indicated by each FlowSpec rule sub-group includes: matching the first service packet against the rules indicated by any FlowSpec rule sub-group in the target FlowSpec rule group, and in response to that the any FlowSpec rule sub-group does not include an identifier, after a rule that is successfully matched is hit in the rules indicated by the any FlowSpec rule sub-group, terminating a matching operation in the any FlowSpec rule sub-group, and matching the first service packet against the rules indicated by a next FlowSpec rule sub-group in the target FlowSpec rule group. A matching manner is determined based on whether the FlowSpec rule sub-group has an identifier and a value of the identifier, so that a rule matching manner is more flexible.

In a possible implementation, the FlowSpec is an application-aware networking APN flow specification; and that the first network device processes the first service packet according to the target FlowSpec rule group includes: The first network device adds APN feature information corresponding to the target rule to the first service packet or an encapsulation of a packet header corresponding to an outer tunnel of the first service packet, where the APN feature information indicates an application or a user corresponding to the first service packet. The FlowSpec is extended to the APN flow specification, to combine the FlowSpec and the APN, and the first service packet is processed by using the APN flow specification, so that after the service packet enters a network, an application and a requirement can be determined based on the APN feature information, to provide refined network resource allocation, transmission path scheduling, and SLA quality of service assurance.

In a possible implementation, that the first network device adds application-aware networking APN feature information corresponding to the target rule to the first service packet or an outer tunnel encapsulation of the first service packet includes: The first network device adds the application-aware networking APN feature information corresponding to the target rule to a reference location of the first service packet or the outer tunnel encapsulation of the first service packet, where the reference location is a location corresponding to the target rule.

In a possible implementation, the method further includes: The first network device receives an internet protocol version 6 IPv6 extension header type or a bitmap sent by the second network device, where the IPv6 extension header type or the bitmap indicates the reference location. An addition location of the APN feature information is specified, and addition of the APN feature information is more accurate, so that processing speed is improved.

In a possible implementation, when the target FlowSpec rule group includes a plurality of FlowSpec rule sub-groups, the target rule is a plurality of rules that are successfully matched in the plurality of FlowSpec rule sub-groups, and any rule that is successfully matched corresponds to a part of the APN feature information. Because any rule that is successfully matched corresponds to a part of the APN feature information, fragmentation of the APN feature information is implemented, to facilitate fragment-based management.

In a possible implementation, each of the plurality of rules that are successfully matched corresponds to a part of the APN feature information in a matching order, and the part of the APN feature information includes at least one of an application group ID, an application ID, and a user group.

In a possible implementation, the plurality of FlowSpec rule groups include an APN specification group and a non-APN specification group, a priority of the APN specification group is higher than a priority of the non-APN specification group, and a rule in a rule set indicated by the APN specification group is an application-aware networking APN flow specification. The plurality of FlowSpec rule groups are classified into an APN specification group and a non-APN specification group based on whether the FlowSpec rule groups are APN flow rules. Because a priority of the APN specification group is higher than a priority of the non-APN specification group, a service packet may be preferentially processed based on the APN specification group.

In a possible implementation, the APN feature information includes an APN attribute, the APN attribute includes at least one of an APN identifier ID and an APN parameter, and the APN ID is an identifier of a whole or an identifier of a fragment. The APN attribute is used as the APN feature information, the APN attribute may be at least one of an APN identifier ID and an APN parameter, and the APN ID is an identifier of a whole or an identifier of a fragment, so that a manner of carrying the APN feature information is more flexible, and different requirements can be met.

In a possible implementation, the identifier of the fragment includes at least one of an application group ID, an application ID, and a user group, and the APN parameter includes at least one of bandwidth, a delay, a packet loss rate, and a jitter.

In a possible implementation, the APN feature information is added to a packet header corresponding to an outer tunnel of the first service packet, and the outer tunnel includes an internet protocol version 6 IPv6 tunnel, an internet protocol version 6 segment routing SRv6 tunnel, a multi-protocol label switching MPLS tunnel, a virtual extensible local area network VXLAN tunnel, or a generic routing encapsulation GRE tunnel. The diversity of outer tunnels makes the method applicable to more scenarios.

According to a second aspect, a packet processing method is provided. The method includes: A first network device obtains a first service packet. The first network device determines a target flow specification FlowSpec rule group, where the target FlowSpec rule group includes a plurality of FlowSpec rule sub-groups, and each FlowSpec rule sub-group indicates at least one rule in a rule set. The first network device matches, in an order of the plurality of FlowSpec rule sub-groups, the first service packet against the rules indicated by each FlowSpec rule sub-group, and processes the first service packet based on a matching result. The FlowSpec rule group is further subdivided into FlowSpec rule sub-groups, to implement more refined management on the flow specification by using the FlowSpec rule sub-groups.

In a possible implementation, the processing the first service packet based on a matching result includes: processing the first service packet based on an action corresponding to a target rule, where the target rule is a rule that is indicated by the plurality of FlowSpec rule sub-groups, that is in the rule set, and that successfully matches the first service packet.

In a possible implementation, the target FlowSpec rule group is a FlowSpec rule group that is in a plurality of FlowSpec rule groups obtained by the first network device, that successfully matches the first service packet, and that has the highest priority.

In a possible implementation, each FlowSpec rule sub-group corresponds to one identifier, and the matching the first service packet against the rules indicated by each FlowSpec rule sub-group includes: matching the first service packet against the rules indicated by any FlowSpec rule sub-group, and in response to that an identifier corresponding to the any FlowSpec rule sub-group has a first value, after a rule that is successfully matched is hit in the rules indicated by the any FlowSpec rule sub-group, terminating a matching operation in the any FlowSpec rule sub-group, and matching the first service packet against the rules indicated by a next FlowSpec rule sub-group; and in response to that the identifier corresponding to the any FlowSpec rule sub-group has a second value, after a rule that is successfully matched is hit in the rules indicated by the any FlowSpec rule sub-group, continuing to perform a matching operation in the any FlowSpec rule sub-group until matching operations have been performed on all the rules indicated by the any FlowSpec rule sub-group, and then matching the first service packet against the rules indicated by a next FlowSpec rule sub-group. Optionally, an identifier of the FlowSpec rule sub-group and a value of the identifier may be configured in advance.

In a possible implementation, the matching the first service packet against the rules indicated by each FlowSpec rule sub-group includes: matching the first service packet against the rules indicated by any FlowSpec rule sub-group in the target FlowSpec rule group, and in response to that the any FlowSpec rule sub-group does not include an identifier, after a rule that is successfully matched is hit in the rules indicated by the any FlowSpec rule sub-group, terminating a matching operation in the any FlowSpec rule sub-group, and matching the first service packet against the rules indicated by a next FlowSpec rule sub-group in the target FlowSpec rule group. A matching manner is determined based on whether the FlowSpec rule sub-group has an identifier and a value of the identifier, so that a rule matching manner is more flexible.

In a possible implementation, the FlowSpec rule sub-group includes at least one rule in the rule set, and that the first network device determines a target FlowSpec rule group includes: receiving a plurality of rules and first indication information and second indication information corresponding to the rules that are sent by a second network device, where rules corresponding to same first indication information belong to a same FlowSpec rule group, and rules corresponding to same second indication information in a same FlowSpec rule group belong to a same FlowSpec rule sub-group; grouping the rules based on the first indication information corresponding to the rules, to obtain the target FlowSpec rule group; and grouping rules in the target FlowSpec rule group into at least one FlowSpec rule sub-group based on second indication information corresponding to the rules in the target FlowSpec rule group.

Because the first indication information can indicate a FlowSpec rule group, and the second indication information can indicate a FlowSpec rule sub-group, the first network device can quickly determine, based on the first indication information and the second indication information, a FlowSpec rule group and a FlowSpec rule sub-group.

In a possible implementation, the any FlowSpec rule group includes first indication information, and the first indication information corresponds to a rule in the rule set; and the target FlowSpec rule group further includes a plurality of pieces of second indication information, one piece of second indication information corresponds to one FlowSpec rule sub-group, and one piece of second indication information corresponds to the rules indicated by the FlowSpec rule sub-group to which the second indication information belongs. Because the FlowSpec rule group includes the first indication information corresponding to the rules in the rule set, and the target FlowSpec rule group further includes a plurality of pieces of second indication information corresponding to the rules indicated by the FlowSpec rule sub-group to which the second indication information belongs, rules that belong to a same FlowSpec rule sub-group in the target FlowSpec rule group may be managed by using the first indication information and the second indication information.

In a possible implementation, first indication information corresponding to any rule is a group identifier of a FlowSpec rule group to which the any rule belongs; and second indication information corresponding to the any rule is a sub-group identifier of a FlowSpec rule sub-group to which the any rule belongs.

According to a third aspect, a flow specification transmission method is provided. The method includes: A second network device sends a plurality of rules of a flow specification FlowSpec and first indication information corresponding to each rule in the plurality of rules to a first network device, where rules corresponding to same first indication information belong to a same FlowSpec rule group, and different FlowSpec rule groups correspond to different priorities, so that the first network device determines a target FlowSpec rule group from a plurality of FlowSpec rule groups of the FlowSpec in a priority order of FlowSpec rule groups.

The plurality of rules of the FlowSpec and the first indication information corresponding to each rule are sent to the first network device. Because the first indication information can indicate the FlowSpec rule group, the first network device can quickly determine, based on the first indication information, a FlowSpec rule group to which each rule belongs, and subsequently can quickly determine a target FlowSpec rule group based on a priority of the FlowSpec rule group, to process a packet according to the target FlowSpec rule group, to improve processing efficiency.

In a possible implementation, first indication information corresponding to any rule is a group identifier of a FlowSpec rule group to which the any rule belongs, and different group identifiers correspond to different priorities.

In a possible implementation, the method further includes: The second network device sends second indication information corresponding to the rules to the first network device, where rules that are in rules belonging to a same FlowSpec rule group and that correspond to same second indication information belong to a same FlowSpec rule sub-group, so that the first network device traverses FlowSpec rule sub-groups in the same FlowSpec rule group in an order of FlowSpec rule sub-groups.

In a possible implementation, second indication information corresponding to any rule is a sub-group identifier of a FlowSpec rule sub-group to which the any rule belongs, and the sub-group identifier is used for determining the order of the FlowSpec rule sub-groups.

According to a fourth aspect, a flow specification transmission method is provided. The method includes: A first network device receives a plurality of rules of a flow specification FlowSpec and first indication information corresponding to each rule in the plurality of rules that are sent by a second network device, where rules corresponding to same first indication information belong to a same FlowSpec rule group, different FlowSpec rule groups correspond to different priorities, and the priorities are used by the first network device to determine a target FlowSpec rule group from a plurality of FlowSpec rule groups of the FlowSpec.

After the plurality of rules of the FlowSpec and the first indication information corresponding to the rules that are sent by the second network device are received, because the first indication information can indicate the FlowSpec rule group, the first network device can quickly determine, based on the first indication information, a FlowSpec rule group to which the rules belong, and then quickly determine a target FlowSpec rule group based on a priority of each FlowSpec rule group, to subsequently process a service packet according to the FlowSpec rule group.

In a possible implementation, first indication information corresponding to any rule is a group identifier of a FlowSpec rule group to which the any rule belongs, and different group identifiers correspond to different priorities.

In a possible implementation, the method further includes: The first network device receives second indication information corresponding to each rule sent by the second network device, where rules that are in rules belonging to a same FlowSpec rule group and that correspond to same second indication information belong to a same FlowSpec rule sub-group, and the second indication information is used by the first network device to determine a FlowSpec rule sub-group, and traverse FlowSpec rule sub-groups in the same FlowSpec rule group in an order of FlowSpec rule sub-groups. The FlowSpec rule group is divided into FlowSpec rule sub-groups, so that after determining the FlowSpec rule sub-groups, the first network device traverses all FlowSpec rule sub-groups in a same FlowSpec rule group in an order of the FlowSpec rule sub-groups. This implements more refined management of the FlowSpec, and can improve subsequent processing efficiency of service packets.

In a possible implementation, second indication information corresponding to the any rule is a sub-group identifier of a FlowSpec rule sub-group to which the any rule belongs.

According to a fifth aspect, a flow specification transmission method is provided. The method includes: A second network device sends a plurality of rules of a flow specification FlowSpec and first indication information and second indication information corresponding to each rule in the plurality of rules to a first network device, where rules corresponding to same first indication information belong to a same FlowSpec rule group, and rules corresponding to same second indication information in the rules belonging to the same FlowSpec rule group belong to a same FlowSpec rule sub-group, so that the first network device determines the FlowSpec rule group based on the first indication information, determines the FlowSpec rule sub-group based on the second indication information, and traverses all FlowSpec rule sub-groups in the same FlowSpec rule group in an order of FlowSpec rule sub-groups.

The plurality of rules of the FlowSpec and the first indication information and the second indication information corresponding to the rules are sent to the first network device together. Because the first indication information can indicate a FlowSpec rule group, and the second indication information can indicate a FlowSpec rule sub-group, the first network device can quickly determine, based on the first indication information and the second indication information, a FlowSpec rule sub-group that is in a FlowSpec rule group and to which each rule belongs, to subsequently improve processing efficiency of service packets.

In a possible implementation, first indication information corresponding to any rule is a group identifier of a FlowSpec rule group to which the any rule belongs, and different group identifiers correspond to different priorities, so that the first network device determines a target FlowSpec rule group from a plurality of FlowSpec rule groups of the FlowSpec in a priority order of FlowSpec rule groups. Because group identifiers of different FlowSpec rule groups correspond to different priorities, the target FlowSpec rule group can be quickly determined based on the priorities.

In a possible implementation, second indication information corresponding to any rule is a sub-group identifier of a FlowSpec rule sub-group to which the any rule belongs, and the sub-group identifier is used for determining the order of the FlowSpec rule sub-groups.

According to a sixth aspect, a flow specification transmission method is provided. The method includes: A first network device receives a plurality of rules of a flow specification FlowSpec and first indication information and second indication information corresponding to each rule in the plurality of rules that are sent by a second network device, where rules corresponding to same first indication information belong to a same FlowSpec rule group, and rules corresponding to same second indication information in the rules belonging to the same FlowSpec rule group belong to a same FlowSpec rule sub-group; and the first indication information is used by the first network device to determine the FlowSpec rule group, and the second indication information is used by the first network device to determine a FlowSpec rule sub-group, and traverse FlowSpec rule sub-groups in the same FlowSpec rule group in an order of FlowSpec rule sub-groups.

Because the first indication information can indicate a FlowSpec rule group, and the second indication information can indicate a FlowSpec rule sub-group, after the plurality of rules of the FlowSpec and the first indication information and the second indication information corresponding to the rules are received, a FlowSpec rule sub-group that is in a FlowSpec rule group and to which each rule belongs can be quickly determined based on the first indication information and the second indication information, so that FlowSpec rule sub-groups in a same FlowSpec rule group are traversed in an order of FlowSpec rule sub-groups, to further improve processing efficiency of a subsequent service packet.

In a possible implementation, first indication information corresponding to any rule is a group identifier of a FlowSpec rule group to which the any rule belongs, different group identifiers correspond to different priorities, and the priorities are used by the first network device to determine a target FlowSpec rule group from a plurality of FlowSpec rule groups of the FlowSpec in a priority order of FlowSpec rule groups. Because group identifiers of different FlowSpec rule groups correspond to different priorities, the target FlowSpec rule group can be quickly determined based on the priorities.

In a possible implementation, second indication information corresponding to any rule is a sub-group identifier of a FlowSpec rule sub-group to which the any rule belongs, and the sub-group identifier is used for determining the order of the FlowSpec rule sub-groups.

According to a seventh aspect, a packet processing apparatus is provided. The apparatus includes:
  an obtaining module, configured to obtain a first service packet and a plurality of flow specification FlowSpec rule groups, where any FlowSpec rule group in the plurality of FlowSpec rule groups indicates a rule set for processing a service packet, and different FlowSpec rule groups correspond to different priorities;
  a determining module, configured to determine a target FlowSpec rule group, where the target FlowSpec rule group is a FlowSpec rule group in the plurality of FlowSpec rule groups that successfully matches the first service packet and that has the highest priority; and
  a processing module, configured to process the first service packet according to the target FlowSpec rule group.

In a possible implementation, the determining module is configured to: sort the plurality of FlowSpec rule groups based on priorities of the FlowSpec rule groups, and match the first service packet against a corresponding FlowSpec rule group in a sorted order until the target FlowSpec rule group that is successfully matched is determined.

In a possible implementation, the any FlowSpec rule group includes a rule in the rule set.

In a possible implementation, the obtaining module is configured to: receive a plurality of rules of a flow specification FlowSpec and first indication information corresponding to the rules that are sent by a second network device, where rules corresponding to same first indication information belong to a same FlowSpec rule group; and group the rules based on the first indication information corresponding to the rules, to obtain at least one FlowSpec rule group.

In a possible implementation, the target FlowSpec rule group corresponds to a plurality of FlowSpec rule sub-groups, and one FlowSpec rule sub-group indicates at least one rule in the rule set.

In a possible implementation, the FlowSpec rule sub-group includes at least one rule in the rule set, and the obtaining module is configured to: receive a plurality of rules of a flow specification FlowSpec and first indication information and second indication information corresponding to the rules that are sent by a second network device, where rules corresponding to same first indication information belong to a same FlowSpec rule group, and rules corresponding to same second indication information in a same FlowSpec rule group belong to a same FlowSpec rule sub-group; group the rules based on the first indication information corresponding to the rules, to obtain the plurality of FlowSpec rule groups; and for any FlowSpec rule group, group rules in the any FlowSpec rule group into at least one FlowSpec rule sub-group based on second indication information corresponding to the rules in the any FlowSpec rule group.

In a possible implementation, the any FlowSpec rule group includes first indication information, and the first indication information corresponds to a rule in the rule set.

In a possible implementation, the target FlowSpec rule group further includes a plurality of FlowSpec rule sub-groups, one FlowSpec rule sub-group includes one piece of second indication information, one FlowSpec rule sub-group indicates at least one rule in the rule set, and the second indication information corresponds to the rules indicated by the FlowSpec rule sub-group to which the second indication information belongs.

In a possible implementation, second indication information corresponding to the any rule is a sub-group identifier of a FlowSpec rule sub-group to which the any rule belongs.

In a possible implementation, first indication information corresponding to any rule is a group identifier of a FlowSpec rule group to which the any rule belongs, and different group identifiers correspond to different priorities.

In a possible implementation, the processing module is configured to: determine a target rule from a rule set indicated by the target FlowSpec rule group, and process the first service packet based on an action corresponding to the target rule.

In a possible implementation, the processing module is configured to match, based on that the target FlowSpec rule group includes a plurality of FlowSpec rule sub-groups, the first service packet against the rules indicated by each FlowSpec rule sub-group, and use a rule that is successfully matched as the target rule.

In a possible implementation, each FlowSpec rule sub-group corresponds to one identifier, and the processing module is configured to: match the first service packet against the rules indicated by any FlowSpec rule sub-group in the target FlowSpec rule group, and in response to that an identifier corresponding to the any FlowSpec rule sub-group has a first value, after a rule that is successfully matched is hit in the rules indicated by the any FlowSpec rule sub-group, terminate a matching operation in the any FlowSpec rule sub-group, and match the first service packet against the rules indicated by a next FlowSpec rule sub-group; and in response to that the identifier corresponding to the any FlowSpec rule sub-group has a second value, after a rule that is successfully matched is hit in the rules indicated by the any FlowSpec rule sub-group, continue to perform a matching operation in the any FlowSpec rule sub-group until matching operations have been performed on all the rules indicated by the any FlowSpec rule sub-group, and then match the first service packet against the rules indicated by a next FlowSpec rule sub-group.

In a possible implementation, the processing module is configured to: match the first service packet against the rules indicated by any FlowSpec rule sub-group in the target FlowSpec rule group, and in response to that the any FlowSpec rule sub-group does not include an identifier, after a rule that is successfully matched is hit in the rules indicated by the any FlowSpec rule sub-group, terminate a matching operation in the any FlowSpec rule sub-group, and match the first service packet against the rules indicated by a next FlowSpec rule sub-group in the target FlowSpec rule group.

In a possible implementation, the FlowSpec is an application-aware networking APN flow specification; and the processing module is configured to add APN feature information corresponding to the target rule to the first service packet or an outer tunnel encapsulation of the first service packet, where the APN feature information indicates an application or a user corresponding to the first service packet.

In a possible implementation, the processing module is configured to add the application-aware networking APN feature information corresponding to the target rule to a reference location of the first service packet or the outer tunnel encapsulation of the first service packet, where the reference location is a location corresponding to the target rule.

In a possible implementation, the apparatus further includes:

a receiving module, configured to receive an internet protocol version 6 IPv6 extension header type or a bitmap sent by the second network device, where the IPv6 extension header type or the bitmap indicates the reference location.

In a possible implementation, when the target FlowSpec rule group includes a plurality of FlowSpec rule sub-groups, the target rule is a plurality of rules that are successfully matched in the plurality of FlowSpec rule sub-groups, and any rule that is successfully matched corresponds to a part of the APN feature information.

In a possible implementation, each of the plurality of rules that are successfully matched corresponds to a part of the APN feature information in a matching order, and the part of the APN feature information includes at least one of an application group ID, an application ID, and a user group.

In a possible implementation, the plurality of FlowSpec rule groups include an APN specification group and a non-APN specification group, a priority of the APN specification group is higher than a priority of the non-APN specification group, and a rule in a rule set indicated by the APN specification group is an application-aware networking APN flow specification.

In a possible implementation, the APN feature information includes an APN attribute, the APN attribute includes at least one of an APN identifier ID and an APN parameter, and the APN ID is an identifier of a whole or an identifier of a fragment.

In a possible implementation, the identifier of the fragment includes at least one of an application group ID, an application ID, and a user group, and the APN parameter includes at least one of bandwidth, a delay, a packet loss rate, and a jitter.

In a possible implementation, the APN feature information is added to a packet header corresponding to an outer tunnel of the first service packet, and the outer tunnel includes an internet protocol version 6 IPv6 tunnel, an internet protocol version 6 segment routing SRv6 tunnel, a multi-protocol label switching MPLS tunnel, a virtual extensible local area network VXLAN tunnel, or a generic routing encapsulation GRE tunnel.

According to an eighth aspect, a packet processing apparatus is provided. The apparatus includes:

an obtaining module, configured to obtain a first service packet;

a determining module, configured to determine a target flow specification FlowSpec rule group, where the target FlowSpec rule group includes a plurality of FlowSpec rule sub-groups, and each FlowSpec rule sub-group indicates at least one rule in a rule set; and a processing module, configured to: match, in an order of the plurality of FlowSpec rule sub-groups, the first service packet against the rules indicated by each FlowSpec rule sub-group, and process the first service packet based on a matching result.

In a possible implementation, the processing module is configured to process the first service packet based on an action corresponding to a target rule, where the target rule is a rule that is indicated by the plurality of FlowSpec rule sub-groups, that is in the rule set, and that successfully matches the first service packet.

In a possible implementation, the target FlowSpec rule group is a FlowSpec rule group that is in a plurality of FlowSpec rule groups obtained by the first network device, that successfully matches the first service packet, and that has the highest priority.

In a possible implementation, each FlowSpec rule sub-group corresponds to one identifier, and the processing module is configured to: match the first service packet against the rules indicated by any FlowSpec rule sub-group, and in response to that an identifier corresponding to the any FlowSpec rule sub-group has a first value, after a rule that is successfully matched is hit in the rules indicated by the any FlowSpec rule sub-group, terminate a matching operation in the any FlowSpec rule sub-group, and match the first service packet against the rules indicated by a next FlowSpec rule sub-group; and in response to that the identifier corresponding to the any FlowSpec rule sub-group has a second value, after a rule that is successfully matched is hit in the rules indicated by the any FlowSpec rule sub-group, continue to perform a matching operation in the any FlowSpec rule sub-group until matching operations have been performed on all the rules indicated by the any FlowSpec rule sub-group, and then match the first service packet against the rules indicated by a next FlowSpec rule sub-group.

In a possible implementation, the processing module is configured to: match the first service packet against the rules indicated by any FlowSpec rule sub-group in the target FlowSpec rule group, and in response to that the any FlowSpec rule sub-group does not include an identifier, after a rule that is successfully matched is hit in the rules indicated by the any FlowSpec rule sub-group, terminate a matching operation in the any FlowSpec rule sub-group, and match the first service packet against the rules indicated by a next FlowSpec rule sub-group in the target FlowSpec rule group.

In a possible implementation, the FlowSpec rule sub-group includes at least one rule in the rule set, and the determining module is configured to: receive a plurality of rules and first indication information and second indication information corresponding to the rules that are sent by a second network device, where rules corresponding to same first indication information belong to a same FlowSpec rule group, and rules corresponding to same second indication information in a same FlowSpec rule group belong to a same FlowSpec rule sub-group; group the rules based on the first indication information corresponding to the rules, to obtain the target FlowSpec rule group; and group rules in the target FlowSpec rule group into at least one FlowSpec rule sub-group based on second indication information corresponding to the rules in the target FlowSpec rule group.

In a possible implementation, the any FlowSpec rule group includes first indication information, and the first indication information corresponds to a rule in the rule set; and the target FlowSpec rule group further includes a plurality of pieces of second indication information, one piece of second indication information corresponds to one FlowSpec rule sub-group, and one piece of second indication information corresponds to the rules indicated by the FlowSpec rule sub-group to which the second indication information belongs.

In a possible implementation, first indication information corresponding to any rule is a group identifier of a FlowSpec rule group to which the any rule belongs; and second indication information corresponding to the any rule is a sub-group identifier of a FlowSpec rule sub-group to which the any rule belongs.

According to a ninth aspect, a flow specification transmission apparatus is provided. The apparatus includes:
a sending module, configured to send a plurality of rules of a flow specification FlowSpec and first indication information corresponding to each rule in the plurality of rules to a first network device, where
rules corresponding to same first indication information belong to a same FlowSpec rule group, and different FlowSpec rule groups correspond to different priorities, so that the first network device determines a target FlowSpec rule group from a plurality of FlowSpec rule groups of the FlowSpec in a priority order of FlowSpec rule groups.

In a possible implementation, first indication information corresponding to any rule is a group identifier of a FlowSpec rule group to which the any rule belongs, and different group identifiers correspond to different priorities.

In a possible implementation, the sending module is further configured to send second indication information corresponding to the rules to the first network device, where rules that are in rules belonging to a same FlowSpec rule group and that correspond to same second indication information belong to a same FlowSpec rule sub-group, so that the first network device traverses FlowSpec rule sub-groups in the same FlowSpec rule group in an order of FlowSpec rule sub-groups.

In a possible implementation, second indication information corresponding to any rule is a sub-group identifier of a FlowSpec rule sub-group to which the any rule belongs, and the sub-group identifier is used for determining the order of the FlowSpec rule sub-groups.

According to a tenth aspect, a flow specification transmission apparatus is provided. The apparatus includes:
a receiving module, configured to receive a plurality of rules of a flow specification FlowSpec and first indication information corresponding to each rule in the plurality of rules that are sent by a second network device, where rules corresponding to same first indication information belong to a same FlowSpec rule group, different FlowSpec rule groups correspond to different priorities, and the priorities are used for determining a target FlowSpec rule group from a plurality of FlowSpec rule groups of the FlowSpec.

In a possible implementation, first indication information corresponding to any rule is a group identifier of a FlowSpec rule group to which the any rule belongs, and different group identifiers correspond to different priorities.

In a possible implementation, the receiving module is further configured to receive second indication information corresponding to each rule sent by the second network device, where rules that are in rules belonging to a same FlowSpec rule group and that correspond to same second indication information belong to a same FlowSpec rule sub-group, and the second indication information is used for determining a FlowSpec rule sub-group, and traversing FlowSpec rule sub-groups in the same FlowSpec rule group in an order of FlowSpec rule sub-groups.

In a possible implementation, second indication information corresponding to the any rule is a sub-group identifier of a FlowSpec rule sub-group to which the any rule belongs.

According to an eleventh aspect, a flow specification transmission apparatus is provided. The apparatus includes:
a sending module, configured to send a plurality of rules of a flow specification FlowSpec and first indication information and second indication information corresponding to each rule in the plurality of rules to a first network device, where
rules corresponding to same first indication information belong to a same FlowSpec rule group, and rules corresponding to same second indication information in the rules belonging to the same FlowSpec rule group belong to a same FlowSpec rule sub-group, so that the first network device determines the FlowSpec rule group based on the first indication information, determines the FlowSpec rule sub-group based on the second indication information, and traverses all FlowSpec rule sub-groups in the same FlowSpec rule group in an order of FlowSpec rule sub-groups.

In a possible implementation, first indication information corresponding to any rule is a group identifier of a FlowSpec rule group to which the any rule belongs, and different group identifiers correspond to different priorities, so that the first network device determines a target FlowSpec rule group from a plurality of FlowSpec rule groups of the FlowSpec in a priority order of FlowSpec rule groups.

In a possible implementation, second indication information corresponding to any rule is a sub-group identifier of a FlowSpec rule sub-group to which the any rule belongs, and the sub-group identifier is used for determining the order of the FlowSpec rule sub-groups.

According to a twelfth aspect, a flow specification transmission apparatus is provided. The apparatus includes:

a receiving module, configured to receive a plurality of rules of a flow specification FlowSpec and first indication information and second indication information corresponding to each rule in the plurality of rules that are sent by a second network device, where rules corresponding to same first indication information belong to a same FlowSpec rule group, and rules corresponding to same second indication information in the rules belonging to the same FlowSpec rule group belong to a same FlowSpec rule sub-group; and the first indication information is used by the first network device to determine the FlowSpec rule group, and the second indication information is used by the first network device to determine a FlowSpec rule sub-group, and traverse FlowSpec rule sub-groups in the same FlowSpec rule group in an order of FlowSpec rule sub-groups.

In a possible implementation, first indication information corresponding to any rule is a group identifier of a FlowSpec rule group to which the any rule belongs, different group identifiers correspond to different priorities, and the priorities are used for determining a target FlowSpec rule group from a plurality of FlowSpec rule groups of the FlowSpec in a priority order of FlowSpec rule groups.

In a possible implementation, second indication information corresponding to any rule is a sub-group identifier of a FlowSpec rule sub-group to which the any rule belongs, and the sub-group identifier is used for determining the order of the FlowSpec rule sub-groups.

According to a thirteenth aspect, a network device is provided. The network device includes a processor, the processor is coupled to a memory, the memory stores at least one program instruction or code, and the at least one program instruction or code is loaded and executed by the processor, so that the network device implements any one of the foregoing methods.

In an example embodiment, there are one or more processors, and there are one or more memories.

In an example embodiment, the memory may be integrated with the processor, or the memory is disposed independently of the processor.

In a specific implementation process, the memory may be a non-transitory memory, for example, a read-only memory (ROM). The memory and the processor may be integrated on a same chip, or may be separately disposed on different chips. A type of the memory and a manner of setting the memory and the processor are not limited in embodiments of this application.

According to a fourteenth aspect, a communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the communication apparatus is enabled to perform the method in any possible implementation of any one of the foregoing aspects.

According to a fifteenth aspect, a communication system is provided. The communication system includes a first network device and a second network device.

The first network device is configured to perform the method performed by the first network device in any one of the foregoing aspects, and the second network device is configured to perform the method performed by the second network device in any one of the foregoing aspects.

According to a sixteenth aspect, a computer-readable storage medium is provided. The storage medium stores at least one instruction, and the instruction is loaded and executed by a processor, so that a computer implements the method according to any possible implementation of any one of the foregoing aspects.

According to a seventeenth aspect, a computer program (or computer program product) is provided. The computer program (or computer program product) includes computer program code. When the computer program code is run by a computer, the computer is enabled to perform the methods in the foregoing aspects.

According to an eighteenth aspect, a chip is provided, including a processor, configured to invoke, from a memory, and run instructions stored in the memory, so that a communication device in which the chip is installed performs the methods in the foregoing aspects.

According to a nineteenth aspect, another chip is provided, including an input interface, an output interface, a processor, and a memory. The input interface, the output interface, the processor, and the memory are connected to each other by an internal connection path. The processor is configured to execute code in the memory, and when the code is executed, the processor is configured to perform the methods in the foregoing aspects.

BRIEF DESCRIPTION OF THE DRAWINGS

FIG. 1 is a schematic diagram of an implementation environment according to an embodiment of this application;

FIG. 2 is a schematic diagram of content of a traffic filtering action according to an embodiment of this application;

FIG. 3 is a schematic diagram of a format of an APN ID according to an embodiment of this application;

FIG. 4 is a schematic diagram of a structure of a FlowSpec according to an embodiment of this application;

FIG. 5 is a schematic diagram of a structure of another FlowSpec according to an embodiment of this application;

FIG. 6 is a schematic diagram of a structure of another FlowSpec according to an embodiment of this application;

DETAILED DESCRIPTION OF ILLUSTRATIVE EMBODIMENTS

Figure 7:
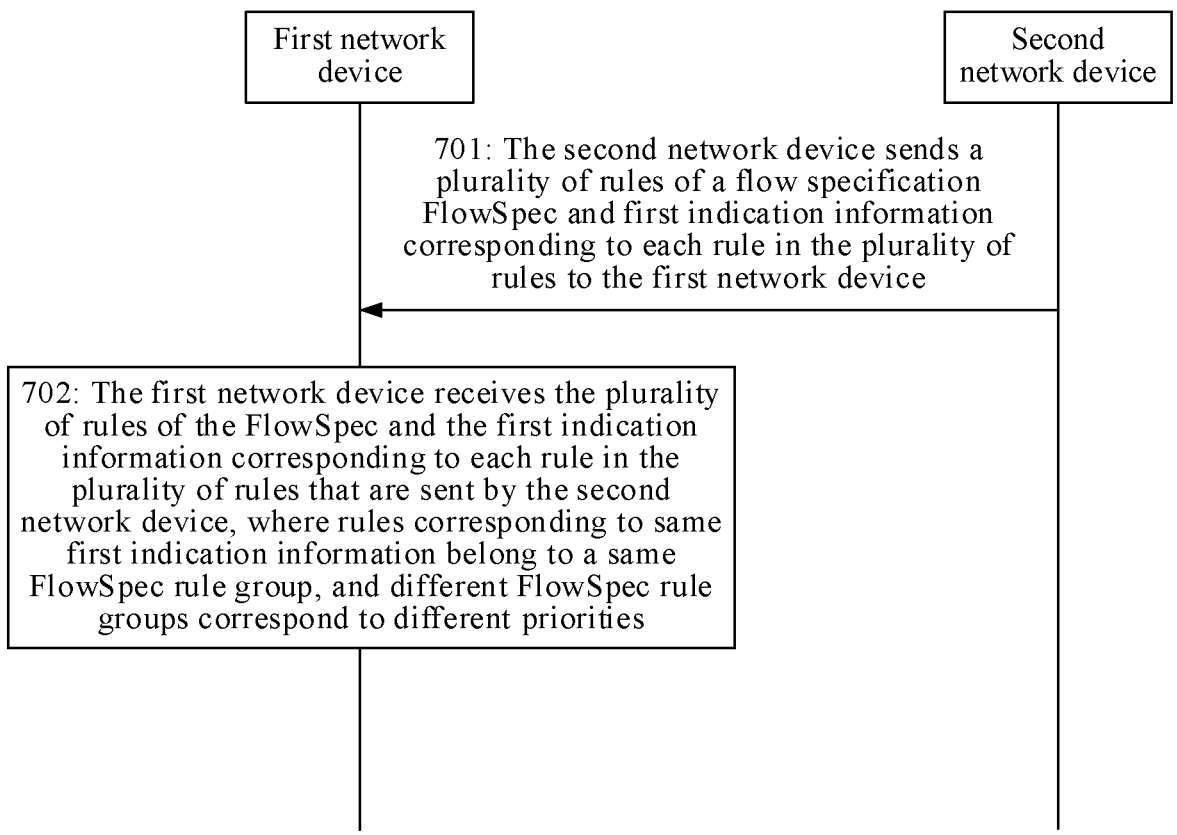
FIG. 7 is a flowchart of a flow specification transmission method according to an embodiment of this application.

To make the objectives, technical solutions, and advantages of this application clearer, the following further describes the implementations of this application in detail with reference to the accompanying drawings.

As requirements for processing service packets keep increasing in number, manners of processing packets become increasingly varied. For example, a FlowSpec can be used to process service packets. Embodiments of this application provide a packet processing method and a flow specification transmission method. The packet processing method and the flow specification transmission method may be applied to a communication network including a plurality of network devices. The network devices in the communication network include, but are not limited to, a server, a switch, a router, a controller, and the like. A type of the network device is not limited in embodiments of this application.

For example, an implementation environment of the packet processing method and the flow specification transmission method may be a communication network shown in FIG. 1. In FIG. 1, the communication network includes a network device 101, a network device 102, a network device 103, a network device 104, a device 105, and a device 106. The network device 101 may be a controller in a network, and the device 105 and the device 106 may be terminal devices, servers, or the like. The network device 102, the network device 103, and the network device 104 may be forwarding devices, for example, routers or switches, in the network. For example, in the communication network shown in FIG. 1, the network device 101 may send a FlowSpec to the network device 102, and a packet sent between the device 105 and the device 106 may be forwarded through a forwarding device in the network. For example, the device 105 may send a service packet to the network device 102, and the network device 102 may process the service packet according to the FlowSpec.

The FlowSpec is an N-tuple, and includes a plurality of rules and an action corresponding to each rule. If a packet matches all rules, it indicates that the packet matches a FlowSpec. Request for comments (RFC) 8955 and RFC 8956 define the rules and actions of the FlowSpecs of the internet protocol version 4 (IPv4) and the internet protocol version 6 (IPv6), respectively. The rules may also be referred to as components used for matching, and the actions may also be referred to as policies.

As shown in FIG. 2, the N-tuple is placed in a network layer reachability information (NLRI) field of a border gateway protocol (border gateway protocol, BGP), and the BGP NLRI field includes a length (length) and an NLRI value. The length may be represented by two hexadecimal digits (0xnn), or may be represented by three hexadecimal digits (0xfnnn). The NLRI value may be a variable. Content of the rules and the actions is not limited in embodiments of this application. For example, the rules, that is, the matching components, include, but are not limited to, a destination prefix, a source prefix, an IP protocol, a port, a destination port, an internet control message protocol (ICMP) type, an ICMP code, a transmission control protocol (TCP) flag, a packet length, a differentiated services code point (DSCP), and a fragment.

For example, an action (a policy) to be executed is placed in an extended community attribute. For example, a traffic filtering action includes, but is not limited to, the following actions:

7.1 Traffic rate in bytes sub-type 0x06 (Traffic Rate in Bytes (traffic-rate-bytes) sub-type 0x06).

7.2 Traffic rate in packets sub-type 0x0c (Traffic Rate in Packets (traffic-rate-packets) sub-type 0x0c).

7.3 Traffic-action sub-type 0x07 (Traffic-action Sub-type 0x07).

7.4. RT redirect sub-type 0x08 (RT Redirect sub-type 0x08).

7.5 Traffic marking sub-type 0x09 (Traffic Marking sub-type 0x09).

7.6 Interaction with other filtering mechanisms in routers.

7.7 Considerations on traffic filtering action interference.

When processing a service packet, a network device obtains a FlowSpec, and matches the service packet against a rule in the FlowSpec. Because the FlowSpec includes a plurality of rules, in the related technology, the plurality of rules of the FlowSpec are mixed together. There is no correlation sequence, there is no hierarchical relationship, and the structure is undiversified. As a result, management efficiency of rules is low, matching efficiency of rules is low, and low processing efficiency of service packets is low.

For example, the rules in the FlowSpec include a 5-tuple-based rule, a ports-based rule, and the like. In addition, with the emergence of various new applications, the requirements for differentiated services and refined operation among different applications become increasingly obvious. To enable networks to effectively sense application requirements and provide refined network resource allocation, transmission path scheduling, and service level agreement (SLA) quality assurance for service flows of different applications, application-aware networking (APN) emerges. Therefore, in the method provided in embodiments of this application, the FlowSpec may be combined with the APN, to extend the APN FlowSpec. In this case, the rules in the FlowSpec may further include rules based on the APN feature information.

For example, the APN feature information includes, but is not limited to, an APN attribute. Optionally, the APN attribute includes at least one of an APN identity (ID) and an APN parameter. The APN parameter includes, but is not limited to, at least one of a bandwidth, a delay, a packet loss rate, and a jitter. The APN ID may be an identifier of a whole, or may be an identifier of a fragment. A type of the APN ID is not limited in embodiments of this application. When the APN ID is an identifier of a fragment, the identifier of the fragment includes at least one of an application group ID, an application (APP) ID, and a user group. Optionally, the identifier of the fragment may further include a flow identifier (Flow ID), an SLA, and the like. For example, a possible format of the APN ID is shown in FIG. 3.

When a plurality of types of rules are combined, all rules need to be organized effectively and applied to specific service flows in a required order. Therefore, in the method provided in embodiments of this application, the rules in the FlowSpec are grouped, and the rules are managed by using the FlowSpec rule group. Different FlowSpec rule groups have corresponding priorities. The network device may perform a matching operation with a service packet in a priority order, to match, in an expected order, a rule specified by a service flow and an action applied to a specific service flow. In this way, there is a specific hierarchical relationship between rules, a hierarchical structure between the rules is enriched, and management efficiency of rules and matching efficiency of rules are improved, so that processing efficiency of service packets is improved.

A rule grouping manner and content of the FlowSpec rule group are not limited in embodiments of this application. For example, grouping may be performed based on whether the FlowSpec rule group is APN specifications, and the FlowSpec rule group may be divided into an APN specification group and a non-APN specification group. In addition, to distinguish between different FlowSpec rule groups, corresponding first indication information may be further configured for each FlowSpec rule group, to indicate the corresponding FlowSpec rule group through the first indication information.

Optionally, based on the division of the FlowSpec rule group, the FlowSpec rule group may be further divided into FlowSpec rule sub-groups, to implement more refined management through the FlowSpec rule sub-groups. To distinguish between different FlowSpec rule sub-groups, corresponding second indication information may be configured for each FlowSpec rule sub-group, to indicate the corresponding FlowSpec rule sub-group through the second indication information.

Content of the first indication information and the second indication information is not limited in embodiments of this application. To cooperate with a flow specification rule, a group identifier and a sub-group identifier are defined in the method provided in embodiments of this application. For example, two octets (2 octets) are used as a group ID, and the other two octets are used as a sub-group ID. For example, the first indication information may be a group identifier (Group ID), and the second indication information may be a sub-group identifier (Sub-Group ID). In this way, the FlowSpec rule group is indicated through the group identifier, and the FlowSpec rule sub-group is indicated through the sub-group identifier.

For ease of understanding, an example in which a plurality of FlowSpec rule groups obtained through division are two FlowSpec rule groups shown in FIG. 4 is used, and each FlowSpec rule group includes a FlowSpec rule group with a group identifier (Group ID)=1 and a FlowSpec rule group with a group identifier (Group ID)=0. Each FlowSpec rule group includes a plurality of rules. It is not difficult to see that a hierarchical relationship may also be reflected through a plurality of groups of FlowSpec rule groups.

Optionally, for a case in which the FlowSpec rule group is further divided into FlowSpec rule sub-groups, using the FlowSpec rule group shown in FIG. 5 as an example, the FlowSpec rule group whose Group ID=1 is divided into three FlowSpec rule sub-groups, which are respectively a FlowSpec rule sub-group whose Sub-Group ID=1, a FlowSpec rule sub-group whose Sub-Group ID=2, and a FlowSpec rule sub-group whose Sub-Group ID=3.

Optionally, for a case in which there are a plurality of FlowSpec rule groups and the FlowSpec rule sub-groups are further obtained through division, using the FlowSpec shown in FIG. 6 as an example, FIG. 6 includes two FlowSpec rule groups: a FlowSpec rule group whose Group ID=1 and a FlowSpec rule group whose Group ID=0. The FlowSpec rule group whose Group ID=1 includes three FlowSpec rule sub-groups, which are respectively a FlowSpec rule sub-group whose Sub-Group ID=1, a FlowSpec rule sub-group whose Sub-Group ID=2, and a FlowSpec rule sub-group whose Sub-Group ID=3. The FlowSpec rule group whose Group ID=0 includes one FlowSpec rule sub-group whose Sub-Group ID=0.

It should be noted that the application group ID (App Group ID), the R. Group ID, the user group identifier (User Group ID), and the like included in the FlowSpec rule groups in FIG. 4 to FIG. 6 are merely examples, and are not limited. R. Group ID is used for general reference, indicating that in addition to the application group ID and the user group ID, another group ID may be included. In FIG. 6, only an example in which the FlowSpec rule group includes a FlowSpec rule sub-group and the FlowSpec rule sub-group directly includes rules is used for description, but is not used to limit content of the FlowSpec rule sub-group. Optionally, the FlowSpec rule sub-group may not directly include rules, but include second indication information indicating the FlowSpec rule sub-group, for example, a sub-group identifier of the FlowSpec rule sub-group, and the second indication information corresponds to the rules indicated by the FlowSpec rule sub-group. In this way, the rules indicated by the FlowSpec rule sub-group are managed based on the second indication information.

Regardless of whether the FlowSpec rule group is divided into FlowSpec rule sub-groups and what content of the FlowSpec rule sub-group is, to enable the network device to process the service packet according to the FlowSpec, the network device that processes the service packet needs to first obtain the FlowSpec. Therefore, an embodiment of this application provides a flow specification transmission method. For example, a FlowSpec is transmitted between a first network device and a second network device. As shown in FIG. 7, the method includes the following step 701 and step 702.

701: The second network device sends a plurality of rules of a FlowSpec and first indication information corresponding to each rule in the plurality of rules to a first network device.

Rules corresponding to same first indication information belong to a same FlowSpec rule group, and different FlowSpec rule groups correspond to different priorities, so that the first network device determines a target FlowSpec rule group from at least one FlowSpec rule group of the FlowSpec in a priority order of FlowSpec rule groups.

Content of the first indication information is not limited in embodiments of this application, provided that different FlowSpec rule groups can be distinguished. For example, first indication information corresponding to any rule is a group identifier of a FlowSpec rule group to which the any rule belongs, and different group identifiers correspond to different priorities.

In addition, an order in which the second network device sends the plurality of rules and the first indication information corresponding to the rules to the first network device is not limited in embodiments of this application. The plurality of rules and the first indication information corresponding to the rules may be sent to the first network device together, or a next rule and the corresponding first indication information may be sent after one rule and the first indication information corresponding to the rule are sent.

Regardless of the order in which the plurality of rules and the first indication information corresponding to the rules are sent, the rules and the corresponding first indication information may be carried in a control packet for sending, or may be carried in a dedicated IP packet for sending. A type of a packet used for sending the rules and the corresponding first indication information is not limited in embodiments of this application.

702: The first network device receives the plurality of rules of the FlowSpec and the first indication information corresponding to each rule in the plurality of rules that are sent by the second network device, where rules corresponding to same first indication information belong to a same FlowSpec rule group, and different FlowSpec rule groups correspond to different priorities.

The priorities are used by the first network device to determine a target FlowSpec rule group from a plurality of FlowSpec rule groups of the FlowSpec in a priority order of FlowSpec rule groups.

The order in which the first network device receives the plurality of rules and the first indication information corresponding to the rules may be determined in a sending order on the side of the second network device. For example, if the second network device sends the plurality of rules and the first indication information corresponding to the rules to the first network device at the same time, the first network device may receive the plurality of rules and the first indication information corresponding to the rules at the same time. In another example, if the second network device sends a next rule and corresponding first indication information after sending one rule and corresponding first indication information, the second network device sequentially receives each rule and corresponding first indication information in a sending order.

For example, the first network device receives a rule 1 and first indication information corresponding to the rule 1, a rule 2 and first indication information corresponding to the rule 2, and a rule 3 and first indication information corresponding to the rule 3 that are sent by the second network device. The first indication information corresponding to the rule 1 is the group identifier 1, the first indication information corresponding to the rule 2 is the group identifier 1, and the first indication information corresponding to the rule 3 is the group identifier 2. The first network device can determine, based on the first indication information corresponding to the rules, that the first indication information corresponding to the rule 1 and the first indication information corresponding to the rule 2 are both the group identifier 1, and determine that the rule 1 and the rule 2 belong to a same FlowSpec rule group, to be specific, a FlowSpec rule group identified by the group identifier 1. The first network device can also determine, based on the first indication information corresponding to the rule 3, that the rule 3 is another FlowSpec rule group identified by the group identifier 2.

As shown in FIG. 7, that the rules of the FlowSpec are grouped into the FlowSpec rule group is merely used as an example for description. Because the rules of the FlowSpec are grouped into the FlowSpec rule group, a plurality of rules of the FlowSpec and first indication information corresponding to the rules are sent to the first network device. Because the first indication information can indicate a FlowSpec rule group, the first network device can quickly determine, based on the first indication information, a FlowSpec rule group to which each rule belongs, and different FlowSpec rule groups can be selected in a priority order. Therefore, management efficiency of rules is improved, and efficiency of processing a service packet subsequently according to the FlowSpec is also improved.

Figure 8:
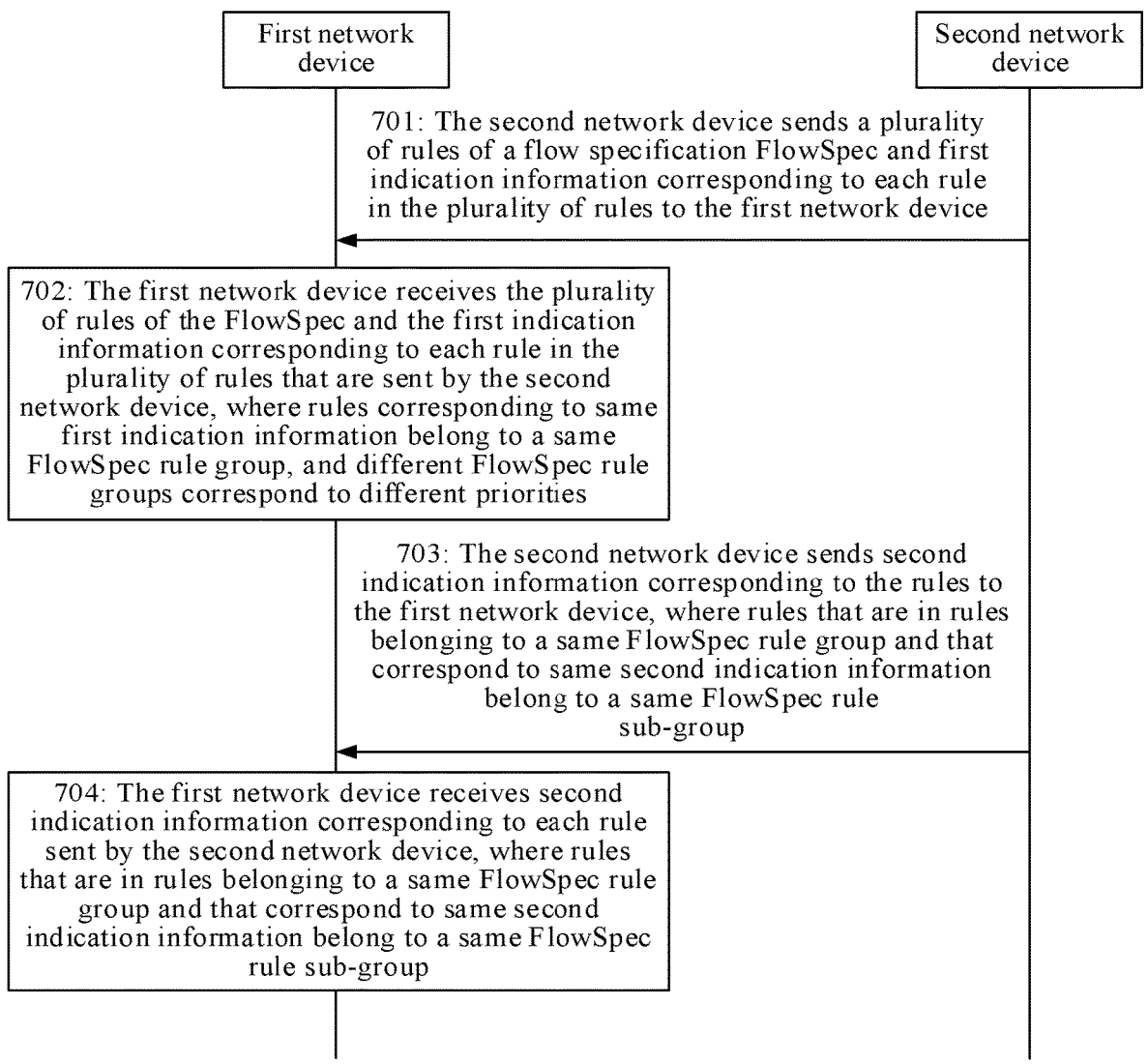
FIG. 8 is a flowchart of another flow specification transmission method according to an embodiment of this application.

In a possible implementation of this application, for a case in which the FlowSpec rule sub-groups are further obtained through division based on the FlowSpec rule group, refer to FIG. 8. Based on step 701 and step 702, the flow specification transmission method further includes the following step 703 and step 704.

703: The second network device sends second indication information corresponding to the rules to the first network device, where rules that are in rules belonging to a same FlowSpec rule group and that correspond to same second indication information belong to a same FlowSpec rule sub-group.

Because rules that are in rules belonging to a same FlowSpec rule group and that correspond to same second indication information belong to a same FlowSpec rule sub-group, the first network device traverses FlowSpec rule sub-groups in the same FlowSpec rule group in an order of FlowSpec rule sub-groups.

Content of the second indication information is not limited in embodiments of this application, provided that different FlowSpec rule sub-groups in a same FlowSpec rule group can be distinguished. For example, second indication information corresponding to the any rule is a sub-group identifier of a FlowSpec rule sub-group to which the any rule belongs.

It should be noted that the second indication information corresponding to the rules may be sent to the first network device together, or may be sent sequentially. A sending order of the second indication information corresponding to the plurality of rules is not limited in embodiments of this application.

704: The first network device receives second indication information corresponding to each rule sent by the second network device, where rules that are in rules belonging to a same FlowSpec rule group and that correspond to same second indication information belong to a same FlowSpec rule sub-group.

The second indication information is used by the first network device to determine a FlowSpec rule sub-group, and traverse FlowSpec rule sub-groups in the same FlowSpec rule group in an order of FlowSpec rule sub-groups.

Figure 9:
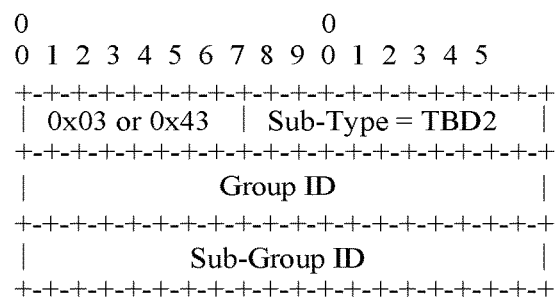
FIG. 9 is a schematic diagram of a structure of a group identifier according to an embodiment of this application.

It should be noted that the first indication information and the second indication information in FIG. 8 may be separately transmitted, that is, not transmitted together. In addition, the first indication information and the second indication information may be transmitted together. To cooperate with the rules of the flow specification, a group identifier and a sub-group identifier are defined in the method provided in embodiments of this application, and a sub-type is a TBD2. The structure shown in FIG. 9 is used as an example. FIG. 9 shows any rule sent by the second network device to the first network device. To be specific, each rule in the foregoing rules may be separately sent. Any rule that is sent separately may be a structure shown in FIG. 9. To be specific, two octets (2 octets) are used as a group ID, and the other two octets are used as a sub-group ID. Optionally, first indication information corresponding to any rule is a group identifier of a FlowSpec rule group to which the any rule belongs, and different group identifiers correspond to different priorities. Second indication information corresponding to the any rule is a sub-group identifier of a FlowSpec rule sub-group to which the any rule belongs. To be specific, the first indication information may be a group identifier, and the second indication information may be a sub-group identifier. In this way, the FlowSpec rule group is indicated through the group identifier, and the FlowSpec rule sub-group is indicated through the sub-group identifier.

Figure 10:
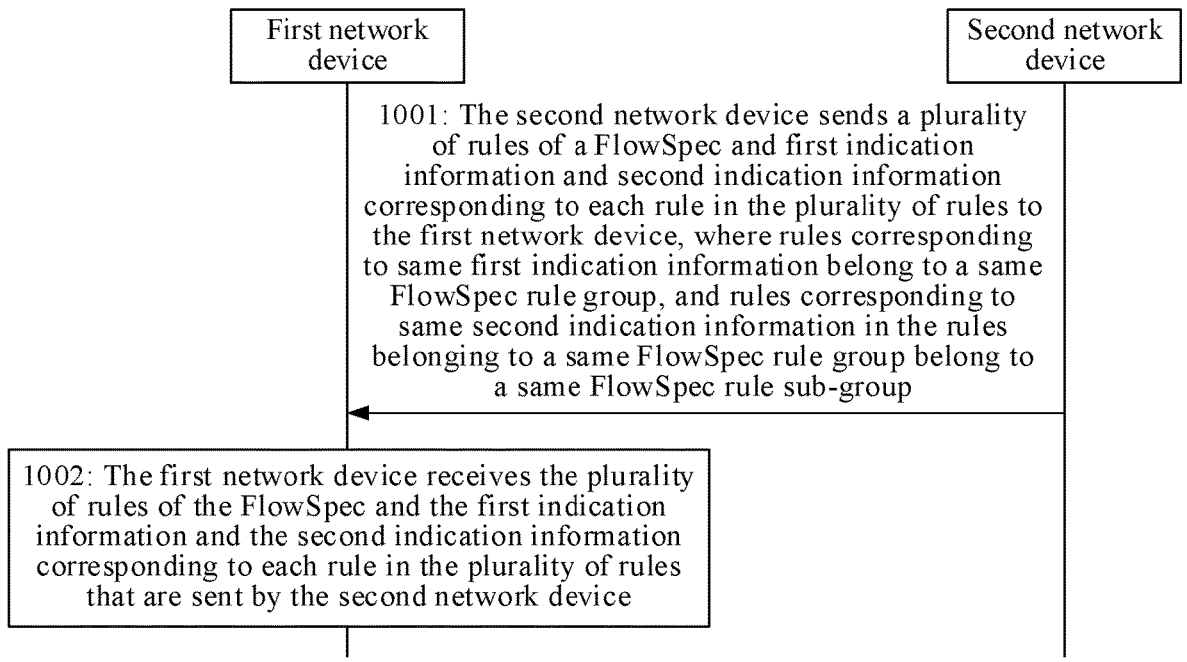
FIG. 10 is a flowchart of another flow specification transmission method according to an embodiment of this application.

Therefore, an embodiment of this application provides another flow specification transmission method. Refer to FIG. 10. The method includes the following step 1001 and step 1002.

1001: A second network device sends a plurality of rules of a FlowSpec and first indication information and second indication information corresponding to each rule in the plurality of rules to a first network device, where rules corresponding to same first indication information belong to a same FlowSpec rule group, and rules corresponding to same second indication information in the rules belonging to a same FlowSpec rule group belong to a same FlowSpec rule sub-group.

The second network device sends the plurality of rules of the FlowSpec and the first indication information and the second indication information corresponding to each rule in the plurality of rules to the first network device, so that the first network device determines the FlowSpec rule group based on the first indication information, determines the FlowSpec rule sub-group based on the second indication information, and traverses all FlowSpec rule sub-groups in the same FlowSpec rule group in an order of FlowSpec rule sub-groups.

In a possible implementation, first indication information corresponding to any rule is a group identifier of a FlowSpec rule group to which the any rule belongs, and different group identifiers correspond to different priorities, so that the first network device determines a target FlowSpec rule group from a plurality of FlowSpec rule groups of the FlowSpec in a priority order of FlowSpec rule groups. Optionally, second indication information corresponding to the any rule is a sub-group identifier of a FlowSpec rule sub-group to which the any rule belongs.

In addition, an order in which the second network device sends the plurality of rules and the first indication information and the second indication information corresponding to the rules to the first network device is not limited in embodiments of this application. The plurality of rules and the first indication information and the second indication information corresponding to the rules may be sent to the first network device together, or a next rule and the corresponding first indication information and second indication information may be sent after one rule and the first indication information and the second indication information corresponding to the rule are sent.

Regardless of the order in which the plurality of rules and the first indication information and the second indication information corresponding to the rules are sent, the rules and the corresponding first indication information and second indication information may be carried in a control packet for sending, or may be carried in a dedicated IP packet for sending. A type of a packet used for sending the rules and the corresponding first indication information and second indication information is not limited in embodiments of this application.

1002: The first network device receives the plurality of rules of the FlowSpec and the first indication information and the second indication information corresponding to each rule in the plurality of rules that are sent by the second network device.

The rules corresponding to the same first indication information belong to the same FlowSpec rule group, and the rules corresponding to the same second indication information in the rules belonging to the same FlowSpec rule group belong to the same FlowSpec rule sub-group. The first indication information is used by the first network device to determine the FlowSpec rule group. The second indication information is used by the first network device to determine a FlowSpec rule sub-group, and traverse FlowSpec rule sub-groups in the same FlowSpec rule group in an order of FlowSpec rule sub-groups.

Optionally, first indication information corresponding to any rule is a group identifier of a FlowSpec rule group to which the any rule belongs, different group identifiers correspond to different priorities, and the priorities are used by the first network device to determine the target FlowSpec rule group from the plurality of FlowSpec rule groups of the FlowSpec in the priority order of FlowSpec rule groups.

For example, the first network device receives a rule 1 and first indication information and second indication information corresponding to the rule 1, a rule 2 and first indication information and second indication information corresponding to the rule 2, a rule 3 and first indication information and second indication information corresponding to the rule 3, and a rule 4 and first indication information and second indication information corresponding to the rule 4 that are sent by the second network device. The first indication information corresponding to the rule 1 is a group identifier 1, the second indication information corresponding to the rule 1 is a sub-group identifier 1, the first indication information corresponding to the rule 2 is the group identifier 1, the second indication information corresponding to the rule 2 is a sub-group identifier 2, the first indication information corresponding to the rule 3 is a group identifier 2, the second indication information corresponding to the rule 3 is the sub-group identifier 1, and the first indication information corresponding to the rule 4 is the group identifier 2. The second indication information corresponding to the rule 4 is the sub-group identifier 1.

Therefore, the first network device can determine, based on the first indication information corresponding to the rules, that the first indication information corresponding to the rule 1 and the first indication information corresponding to the rule 2 are both the group identifier 1, and determine that the rule 1 and the rule 2 belong to a same FlowSpec rule group, to be specific, a FlowSpec rule group identified by the group identifier 1. In addition, because the sub-group identifier 1 and the sub-group identifier 2 corresponding to the rule 1 are different, the rule 1 and the rule 2 belong to different FlowSpec rule sub-groups in a same FlowSpec rule group. The first network device can also determine, based on the first indication information corresponding to the rule 3 and the rule 4, that the rule 3 and the rule 4 belong to another FlowSpec rule group identified by the group identifier 2, and further determine, based on the second indication information corresponding to the rule 3 and the rule 4, that the rule 3 and the rule 4 belong to a same FlowSpec rule sub-group.

Optionally, the order in which the first network device receives the plurality of rules and the first indication information and the second indication information corresponding to the rules may be determined in a sending order on the side of the second network device. For example, if the second network device sends the plurality of rules and the first indication information and the second indication information corresponding to the rules to the first network device at the same time, the first network device may receive the plurality of rules and the first indication information and the second indication information corresponding to the rules at the same time. In another example, if the second network device sends a next rule and corresponding first indication information and second indication information after sending one rule and corresponding first indication information and second indication information, the second network device sequentially receives each rule and corresponding first indication information and second indication information in a sending order.

According to the method shown in FIG. 10, the plurality of rules of the FlowSpec and the first indication information and the second indication information corresponding to the rules are sent to the first network device together. Because the first indication information can indicate a FlowSpec rule group, and the second indication information can indicate a FlowSpec rule sub-group, the first network device can quickly determine, based on the first indication information and the second indication information, a FlowSpec rule sub-group that is in a FlowSpec rule group and to which each rule belongs, to subsequently improve processing efficiency of service packets.

Figure 11:
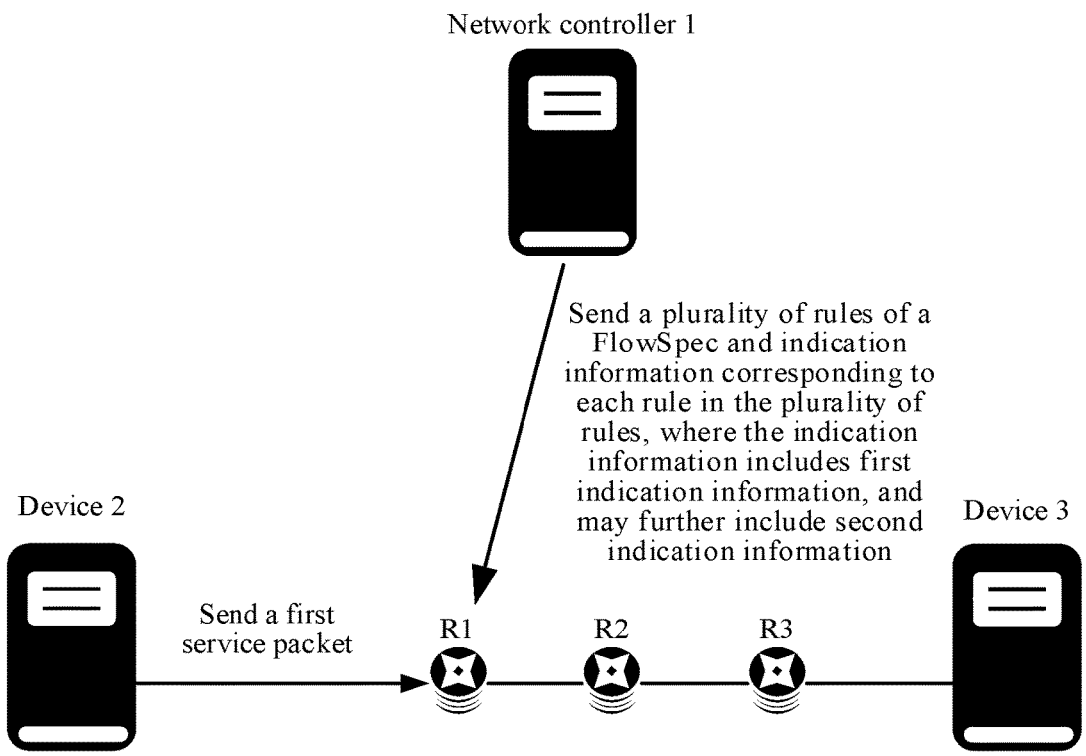
FIG. 11 is a schematic diagram of a structure of a communication network according to an embodiment of this application.

For example, the flow specification transmission method shown in FIG. 7, FIG. 8, or FIG. 10 is applied to a communication network shown in FIG. 11. As shown in FIG. 11, the communication network includes a network controller 1, a device 2, a router R1, a router R2, a router R3, and a device 3. The network controller 1 is the second network device shown in FIG. 7, FIG. 8, or FIG. 10, and the router R1 is the first network device shown in FIG. 7, FIG. 8, or FIG. 10. Service packets are transmitted between the device 2 and the device 3, and these service packets are forwarded through the routers R1, R2, and R3. In this case, a flow specification transmission process may be performed between the network controller 1 and the router R1 by using the method shown in FIG. 7, FIG. 8, or FIG. 10.

Figure 12:
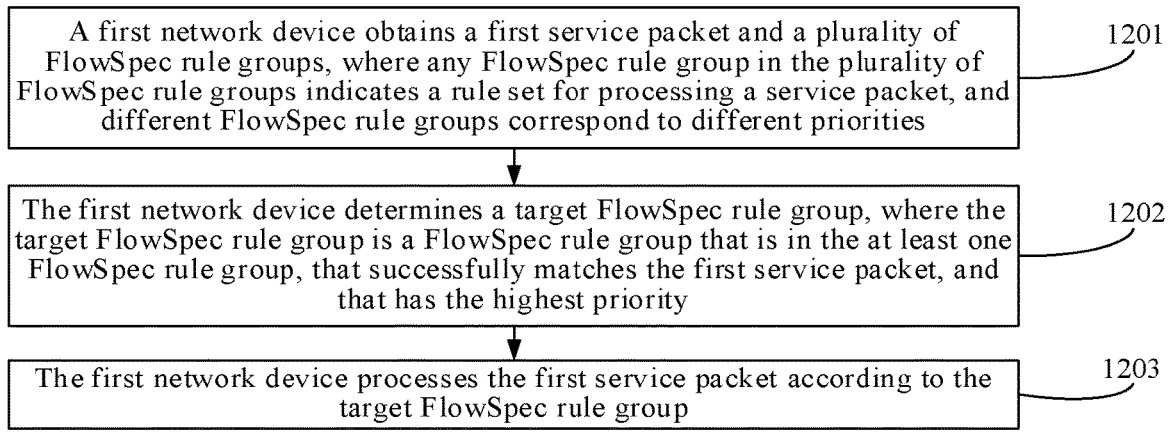
FIG. 12 is a flowchart of a packet processing method according to an embodiment of this application.

Next, for a manner of processing a service packet based on a FlowSpec, an embodiment of this application provides a packet processing method. An example in which a first network device processes a first service packet is used. Refer to FIG. 12. The method includes the following step 1201 to step 1203.

1201: A first network device obtains a first service packet and a plurality of FlowSpec rule groups, where any FlowSpec rule group in the plurality of FlowSpec rule groups indicates a rule set for processing a service packet, and different FlowSpec rule groups correspond to different priorities.

A type of the first service packet is not limited in embodiments of this application, and the first service packet includes, but is not limited to, packets of various services. For example, the first service packet is a video service packet, or an audio service packet, or may be a game service packet. The first network device may receive the first service packet from an upstream network device. For example, in the communication network shown in FIG. 11, for example, the first network device is a router R1, and the router R1 may receive the first service packet from the device 2. To process the first service packet, the first network device further obtains the FlowSpec rule group. Content of the FlowSpec rule group includes, but is not limited to, the following several cases.

Case A: The any FlowSpec rule group includes a rule in the rule set.

In the case A, because the FlowSpec rule group directly includes a rule in the rule set, the rule may be directly managed by using the FlowSpec rule group. That a first network device obtains a plurality of FlowSpec rule groups includes, but not limited to: receiving a plurality of rules of a flow specification FlowSpec and first indication information corresponding to the rules that are sent by a second network device, where rules corresponding to same first indication information belong to a same FlowSpec rule group; and grouping the rules based on the first indication information corresponding to the rules, to obtain at least one FlowSpec rule group.

For a manner in which the first network device receives a plurality of rules of a FlowSpec and first indication information corresponding to each rule that are sent by the second network device, refer to related descriptions in the embodiment shown in FIG. 7. Details are not described herein again. Optionally, if the first network device has obtained, from the side of the second network device, a plurality of rules of the FlowSpec and the first indication information corresponding to the rules before receiving the first service packet this time, and the first network device locally stores the plurality of rules of the FlowSpec and the first indication information corresponding to the rules, when processing the first service packet this time, the first network device may locally obtain the plurality of rules of the FlowSpec and the first indication information corresponding to the rules.

Case B: The any FlowSpec rule group includes first indication information, and the first indication information corresponds to a rule in the rule set.

Different from the foregoing Case A, in Case B, the FlowSpec rule group does not directly include the rules, but includes the first indication information corresponding to the rules. If a plurality of rules belong to a same FlowSpec rule group, the FlowSpec rule group includes only one piece of first indication information. Therefore, compared with that a plurality of rules are directly included, resources can be saved. In addition, because the FlowSpec rule group includes the first indication information corresponding to the rules in the rule set, rules belonging to a same FlowSpec rule group may be managed by using the first indication information.

For both the case A and the case B, based on the division of the FlowSpec rule group, FlowSpec rule sub-groups may be further divided. For example, any FlowSpec rule group corresponds to a plurality of FlowSpec rule sub-groups, and one FlowSpec rule sub-group indicates at least one rule in the rule set.

Content of the FlowSpec rule sub-group is not limited in embodiments of this application, provided that the FlowSpec rule sub-group can indicate at least one rule in the rule set. For example, the FlowSpec rule sub-group includes at least one rule in the rule set. In this case, that a first network device obtains a plurality of FlowSpec rule groups includes: receiving a plurality of rules of a FlowSpec and first indication information and second indication information corresponding to the rules that are sent by a second network device, where rules corresponding to same first indication information belong to a same FlowSpec rule group, and rules corresponding to same second indication information in a same FlowSpec rule group belong to a same FlowSpec rule sub-group.

Correspondingly, the first network device may group the rules based on the first indication information corresponding to the rules, to obtain a plurality of FlowSpec rule groups. For any FlowSpec rule group, rules in the any FlowSpec rule group are grouped into at least one FlowSpec rule sub-group based on second indication information corresponding to the rules in the any FlowSpec rule group.

Optionally, instead of directly including the indicated rules, the FlowSpec rule sub-group may not directly include the indicated rules. Instead, one FlowSpec rule sub-group includes one piece of second indication information, one FlowSpec rule sub-group indicates at least one rule in the rule set, and the second indication information corresponds to the rules indicated by the FlowSpec rule sub-group to which the second indication information belongs. Because the FlowSpec rule group includes a plurality of FlowSpec rule sub-groups, and the FlowSpec rule sub-group includes second indication information corresponding to rules indicated by the FlowSpec rule sub-group, rules belonging to a same FlowSpec rule sub-group may be managed by using the second indication information.

In a possible implementation, in any foregoing case, second indication information corresponding to the any rule is a sub-group identifier of a FlowSpec rule sub-group to which the any rule belongs. Optionally, first indication information corresponding to any rule is a group identifier of a FlowSpec rule group to which the any rule belongs, and different group identifiers correspond to different priorities.

For example, the rules obtained by the first network device include a rule 1 and a rule 2. The first indication information corresponding to the rule 1 is a group identifier 1, the second indication information corresponding to the rule 1 is a sub-group identifier 1, the first indication information corresponding to the rule 2 is the group identifier 1, and the second indication information corresponding to the rule 2 is a sub-group identifier 2. Therefore, the first network device can determine, based on the first indication information corresponding to the rules, that the first indication information corresponding to the rule 1 and the first indication information corresponding to the rule 2 are both the group identifier 1, and determine that the rule 1 and the rule 2 belong to a same FlowSpec rule group. To be specific, a FlowSpec rule group identified by the group identifier 1 includes the rule 1 and the rule 2. In the FlowSpec rule group identified by the group identifier 1, because the sub-group identifier 1 and the sub-group identifier 2 corresponding to the rule 1 are different, the rule 1 and the rule 2 belong to different FlowSpec rule sub-groups in a same FlowSpec rule group. The FlowSpec rule sub-group identified by the sub-group identifier 1 includes the rule 1, and the FlowSpec rule sub-group identified by the sub-group identifier 2 includes the rule 2.

1202: The first network device determines a target FlowSpec rule group, where the target FlowSpec rule group is a FlowSpec rule group that is in the at least one FlowSpec rule group, that successfully matches the first service packet, and that has the highest priority.

In a possible implementation, the determining a target FlowSpec rule group includes: sorting the plurality of FlowSpec rule groups based on priorities of the FlowSpec rule groups, and matching the first service packet against a corresponding FlowSpec rule group in a sorted order until the target FlowSpec rule group that is successfully matched is determined.

A manner of sorting the plurality of FlowSpec rule groups based on priorities of the FlowSpec rule groups is not limited in embodiments of this application. Optionally, the plurality of FlowSpec rule groups include an APN specification group and a non-APN specification group, a priority of the APN specification group is higher than a priority of the non-APN specification group, and a rule in a rule set indicated by the APN specification group is an APN flow specification. Therefore, for the plurality of FlowSpec rule groups including the APN specification group and the non-APN specification group, after the plurality of FlowSpec rule groups are sorted in descending order of priorities, the APN specification group is located before the non-APN specification group, and the first service packet is first matched with the APN specification group. Once the matching succeeds, the first service packet does not need to be matched against the non-APN specification group.

For example, when the group identifier is used as the first indication information, because different group identifiers correspond to different priorities, a priority may be indicated based on a value of the group identifier. For example, a priority of an identified FlowSpec rule group is higher when a value of a group identifier is smaller. A priority of a FlowSpec rule group whose group identifier is 1 is higher than a priority of a FlowSpec rule group whose group identifier is 2. When the FlowSpec rule group whose group identifier is 1 and the FlowSpec rule group whose group identifier is 2 are sorted based on priorities. If the FlowSpec rule groups are sorted in descending order of priorities, the FlowSpec rule group whose group identifier is 1 is located before the FlowSpec rule group whose group identifier is 2. If the FlowSpec rule groups are sorted in ascending order of priorities, the FlowSpec rule group whose group identifier is 1 is located after the FlowSpec rule group whose group identifier is 2.

After the plurality of FlowSpec rule groups are sorted based on priorities of the FlowSpec rule groups, the first service packet may be matched against a corresponding FlowSpec rule group in a sorted order. A matching manner is not limited in embodiments of this application. Because the FlowSpec rule group indicates a rule set for processing a service packet, for example, the first service packet may be matched against the rules in the rule set indicated by the FlowSpec rule group that is currently performing a matching operation, until the target FlowSpec rule group that is successfully matched is determined. That the matching succeeds includes, but is not limited to, that the first service packet hits at least one rule in a rule set indicated by the target FlowSpec rule group. Optionally, if the FlowSpec rule group is divided into FlowSpec rule sub-groups, that the matching succeeds may also mean that the first service packet hits rules indicated by at least one FlowSpec rule sub-group of the target FlowSpec rule group. A condition for successful matching is not limited in embodiments of this application.

Because the first network device performs a matching operation based on the priority order of the FlowSpec rule groups until it is determined that the target FlowSpec rule group that is successfully matched stops, no matching operation needs to be performed on another FlowSpec rule group whose priority is lower than the target FlowSpec rule group. Therefore, unnecessary matching operations can be reduced, and resources are saved.

1203: The first network device processes the first service packet according to the target FlowSpec rule group.

Optionally, that the first network device processes the first service packet according to the target FlowSpec rule group includes: determining a target rule from a rule set indicated by the target FlowSpec rule group, and processing the first service packet based on an action corresponding to the target rule. The target rule used for processing the first service packet is determined in the target FlowSpec rule group, to improve matching efficiency of rules and processing efficiency of service packets.

A manner of determining the target rule in the rule set indicated by the target FlowSpec rule group is not limited in embodiments of this application. For example, the first service packet may be sequentially matched against rules in the rule set indicated by the target FlowSpec rule group, to determine the target rule that is successfully matched. Optionally, for a case that the target FlowSpec rule group includes a plurality of FlowSpec rule sub-groups, the determining, from the rule set indicated by the target FlowSpec rule group, a target rule that successfully matches the first service packet includes: based on that the target FlowSpec rule group includes a plurality of FlowSpec rule sub-groups, matching the first service packet against the rules indicated by each FlowSpec rule sub-group, and using a rule that is successfully matched as the target rule. When the FlowSpec rule sub-groups are obtained through division, rule matching is performed in an order of the FlowSpec rule sub-groups, so that a matching operation is performed in a finer-grained sequence, and management of a flow specification is more refined.

For example, each FlowSpec rule sub-group corresponds to one identifier. Optionally, an identifier of the FlowSpec rule sub-group and a value of the identifier may be configured in advance. The value of the identifier corresponding to each FlowSpec rule sub-group is not limited in embodiments of this application. The matching the first service packet against the rules indicated by each FlowSpec rule sub-group includes matching the first service packet against the rules indicated by any FlowSpec rule sub-group in the target FlowSpec rule group. According to different values of an identifier, after a matching operation, the method includes, but not limited to, the following two processing manners.

Processing manner 1: In response to that an identifier corresponding to the any FlowSpec rule sub-group has a first value, after a rule that is successfully matched is hit in the rules indicated by the any FlowSpec rule sub-group, a matching operation in the any FlowSpec rule sub-group is terminated, and the first service packet is matched against the rules indicated by a next FlowSpec rule sub-group. The first value is not limited in embodiments of this application. For example, the first value is 0.

Processing manner 2: In response to that the identifier corresponding to the any FlowSpec rule sub-group has a second value, after a rule that is successfully matched is hit in the rules indicated by the any FlowSpec rule sub-group, a matching operation continues to be performed in the any FlowSpec rule sub-group until matching operations have been performed on all the rules indicated by the any FlowSpec rule sub-group, and then the first service packet is matched against the rules indicated by a next FlowSpec rule sub-group. The second value is not limited in embodiments of this application. For example, the second value is 1.

In a possible implementation, for a case in which the FlowSpec rule sub-group does not include an identifier, the matching the first service packet against the rules indicated by each FlowSpec rule sub-group includes: matching the first service packet against the rules indicated by any FlowSpec rule sub-group in the target FlowSpec rule group, and in response to that the any FlowSpec rule sub-group does not include an identifier, after a rule that is successfully matched is hit in the rules indicated by the any FlowSpec rule sub-group, terminating a matching operation in the any FlowSpec rule sub-group, and matching the first service packet against the rules indicated by a next FlowSpec rule sub-group in the target FlowSpec rule group.

Figure 13:
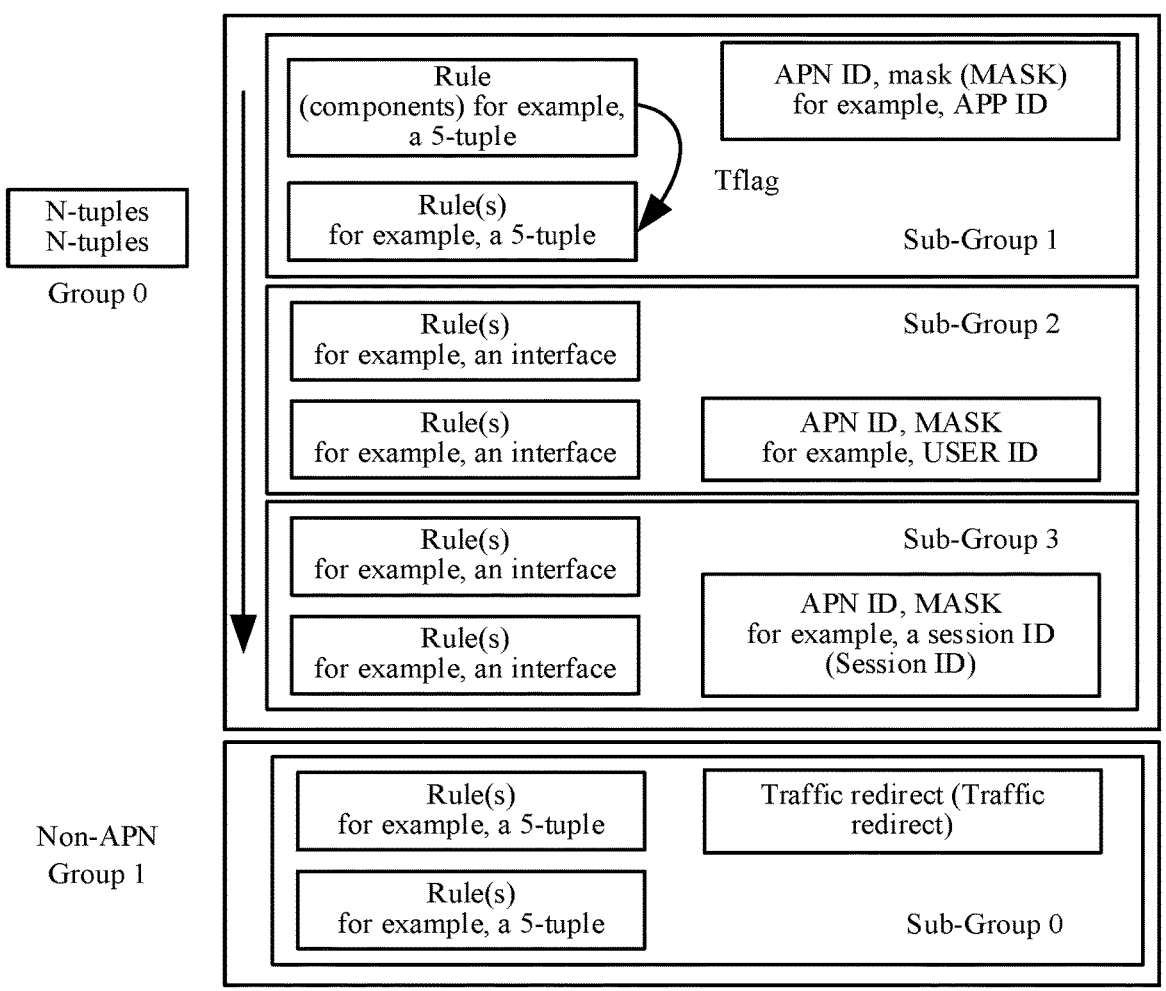
FIG. 13 is a schematic diagram of a structure of another FlowSpec according to an embodiment of this application.

For ease of understanding, the foregoing manner of determining whether the target FlowSpec rule group and the FlowSpec rule sub-group have an identifier and matching, based on a value of the identifier, the first service packet against the rules indicated by each FlowSpec rule sub-group provided in embodiments of this application is described below by using an example in which the plurality of FlowSpec rule groups shown in FIG. 13 are used, the FlowSpec rule group includes a FlowSpec rule sub-group, and the FlowSpec rule sub-group includes at least one rule.

As shown in FIG. 13, the plurality of FlowSpec rule groups include an APN specification group (for example, a non-5-tuple Group 0 in FIG. 13) and a non-APN Group 1. The Group 0 includes three FlowSpec rule sub-groups, which are respectively a FlowSpec rule sub-group corresponding to a Sub-Group 1, a FlowSpec rule sub-group corresponding to a Sub-Group 2, and a FlowSpec rule sub-group corresponding to a Sub-Group 3. Each of the three FlowSpec rule sub-groups included in the Group 0 includes two rules, and each rule in each FlowSpec rule sub-group corresponds to a same action. The Group 1 includes a FlowSpec rule sub-group corresponding to a Sub-Group 0, the FlowSpec rule sub-group corresponding to the Sub-Group 0 also includes two rules, and each rule corresponds to a same action. In addition, FIG. 13 further shows an identifier corresponding to each FlowSpec rule sub-group. An identifier corresponding to a FlowSpec rule sub-group corresponding to the Sub-Group 1 is an APP ID determined based on an APN ID and a mask, an identifier corresponding to a FlowSpec rule sub-group corresponding to the Sub-Group 2 is a USER ID determined based on an APN ID and a mask, and an identifier corresponding to a FlowSpec rule sub-group corresponding to the Sub-Group 3 is a session ID determined based on an APN ID and a mask.

After the sorting is performed based on priorities, a FlowSpec rule group corresponding to the Group 0 is located in a FlowSpec rule group corresponding to the Group 1. Therefore, the first service packet is first matched against rules in a rule set indicated by the FlowSpec rule group corresponding to the Group 0. The first service packet may not be sequentially matched against the rules in the FlowSpec rule sub-groups in an order, or the FlowSpec rule sub-groups may be sorted based on the sub-group identifiers, and the first service packet may be sequentially matched against the rules in the FlowSpec rule sub-groups in an order. For example, the first service packet is matched against rules in the Sub-Group 1 in the Group 0. The Sub-Group 1 includes an identifier (that is, Tflag in FIG. 13). If the first service packet successfully matches the first rule in the Sub-Group 1 in the Group 0, that is, the first rule is hit. If the identifier Tflag included in the Sub-Group 1 is 1, that is, the second value, the matching operation of the next rule continues to be performed in the Sub-Group 1 until all the rules in the Sub-Group 1 are matched. If the identifier Tflag included in the Sub-Group 1=0, that is, the first value, the matching operation is stopped in the Sub-Group 1, and the matching operation continues to be performed in the next Sub-Group 2.

When a matching operation is performed in the Sub-Group 2, if the Sub-Group 2 does not include an identifier, after a rule that is successfully matched is hit in the Sub-Group 2, the matching operation is terminated, and the first service packet is matched against rules in the Sub-Group 3.

In a possible implementation, the FlowSpec is an APN flow specification; and that the first network device processes the first service packet according to the target FlowSpec rule group includes: The first network device adds APN feature information corresponding to the target rule to the first service packet or an outer tunnel encapsulation of the first service packet, where the APN feature information indicates an application or a user corresponding to the first service packet.

The APN feature information is not limited in embodiments of this application, and includes, but is not limited to, an APN attribute. For example, the APN attribute includes at least one of an APN ID and an APN parameter. The APN parameter includes, but is not limited to, at least one of a bandwidth, a delay, a packet loss rate, and a jitter. The APN ID may be an identifier of a whole or an identifier of a fragment. In a possible implementation, the identifier of the fragment includes at least one of an application group ID, an application ID, and a user group. For a case that the APN ID is an identifier of a fragment, when the target FlowSpec rule group includes a plurality of FlowSpec rule sub-groups, the target rule is a plurality of rules that are successfully matched in the plurality of FlowSpec rule sub-groups, and any rule that is successfully matched corresponds to a part of the APN feature information. For example, each of the plurality of rules that are successfully matched corresponds to a part of the APN feature information in a matching order.

In a possible implementation, that the first network device adds application-aware networking APN feature information corresponding to the target rule to the first service packet or an outer tunnel encapsulation of the first service packet includes: The first network device adds, the APN feature information corresponding to the target rule to a reference location of the first service packet or the outer tunnel encapsulation of the first service packet, where the reference location is a location corresponding to the target rule. A manner of determining the reference location by the first network device is not limited in embodiments of this application. In a possible implementation, the method further includes: The first network device receives an IPv6 extension header type or a bitmap sent by the second network device, where the IPv6 extension header type or the bitmap indicates the reference location.

In addition, the type of the outer tunnel of the first service packet is not limited in embodiments of this application, and may be determined based on an application scenario. In a possible implementation, the outer tunnel includes an IPv6 tunnel, an internet protocol version 6 segment routing SRv6 tunnel, a multi-protocol label switching (MPLS) tunnel, a virtual extensible local area network (VXLAN) tunnel, or a generic routing encapsulation (GRE) tunnel.

Figure 14:
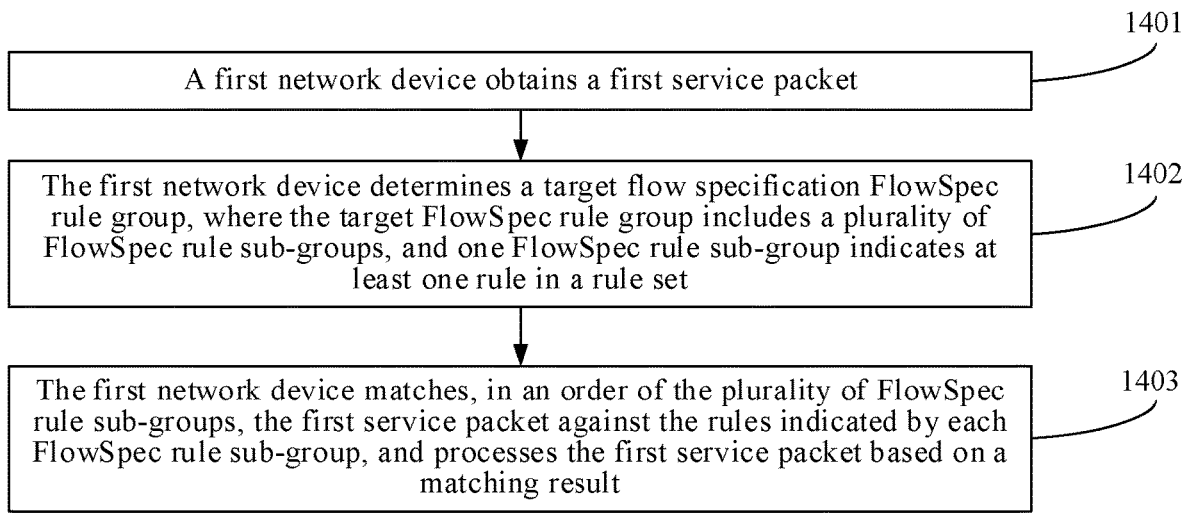
FIG. 14 is a flowchart of another packet processing method according to an embodiment of this application.

An embodiment of this application provides a packet processing method. Refer to FIG. 14. The method includes the following step 1401 to step 1403.

1401: A first network device obtains a first service packet.

For a processing manner of step 1401, refer to step 1201 in the method shown in FIG. 12. Details are not described herein again.

1402: The first network device determines a target flow specification FlowSpec rule group, where the target FlowSpec rule group includes a plurality of FlowSpec rule sub-groups, and one FlowSpec rule sub-group indicates at least one rule in a rule set.

For example, the target FlowSpec rule group is a FlowSpec rule group that is in a plurality of FlowSpec rule groups obtained by the first network device, that successfully matches the first service packet, and that has the highest priority.

In a possible implementation, the FlowSpec rule sub-group includes at least one rule in the rule set, and that the first network device determines a target FlowSpec rule group includes: receiving a plurality of rules and first indication information and second indication information corresponding to the rules that are sent by a second network device, where rules corresponding to same first indication information belong to a same FlowSpec rule group, and rules corresponding to same second indication information in a same FlowSpec rule group belong to a same FlowSpec rule sub-group; grouping the rules based on the first indication information corresponding to the rules, to obtain the target FlowSpec rule group; and grouping rules in the target FlowSpec rule group into at least one FlowSpec rule sub-group based on second indication information corresponding to the rules in the target FlowSpec rule group.

Optionally, the any FlowSpec rule group includes first indication information, and the first indication information corresponds to a rule in the rule set; and the target FlowSpec rule group further includes a plurality of pieces of second indication information, one piece of second indication information corresponds to one FlowSpec rule sub-group, and one piece of second indication information corresponds to the rules indicated by the FlowSpec rule sub-group to which the second indication information belongs.

For example, first indication information corresponding to any rule is a group identifier of a FlowSpec rule group to which the any rule belongs; and second indication information corresponding to the any rule is a sub-group identifier of a FlowSpec rule sub-group to which the any rule belongs.

It should be noted that, for a processing manner of step 1402, refer to related descriptions of step 1202 in the method shown in FIG. 12. Details are not described herein again.

1403: The first network device matches, in an order of the plurality of FlowSpec rule sub-groups, the first service packet against the rules indicated by each FlowSpec rule sub-group, and processes the first service packet based on a matching result.

In a possible implementation, each FlowSpec rule sub-group corresponds to one identifier, and the matching the first service packet against the rules indicated by each FlowSpec rule sub-group includes: matching the first service packet against the rules indicated by any FlowSpec rule sub-group, and in response to that an identifier corresponding to the any FlowSpec rule sub-group has a first value, after a rule that is successfully matched is hit in the rules indicated by the any FlowSpec rule sub-group, terminating a matching operation in the any FlowSpec rule sub-group, and matching the first service packet against the rules indicated by a next FlowSpec rule sub-group; and In response to that the identifier corresponding to the any FlowSpec rule sub-group has a second value, after a rule that is successfully matched is hit in the rules indicated by the any FlowSpec rule sub-group, a matching operation continues to be performed in the any FlowSpec rule sub-group until matching operations have been performed on all the rules indicated by the any FlowSpec rule sub-group, and then the first service packet is matched against the rules indicated by a next FlowSpec rule sub-group.

Optionally, the matching the first service packet against the rules indicated by each FlowSpec rule sub-group includes: matching the first service packet against the rules indicated by any FlowSpec rule sub-group in the target FlowSpec rule group, and in response to that the any FlowSpec rule sub-group does not include an identifier, after a rule that is successfully matched is hit in the rules indicated by the any FlowSpec rule sub-group, terminating a matching operation in the any FlowSpec rule sub-group, and matching the first service packet against the rules indicated by a next FlowSpec rule sub-group in the target FlowSpec rule group.

In a possible implementation, the processing the first service packet based on a matching result includes: processing the first service packet based on an action corresponding to a target rule, where the target rule is a rule that is successfully matched.

It should be noted that, for a processing manner of step 1403, refer to related descriptions of step 1202 and step 1203 in the method shown in FIG. 12. Details are not described herein again.

Figure 15:
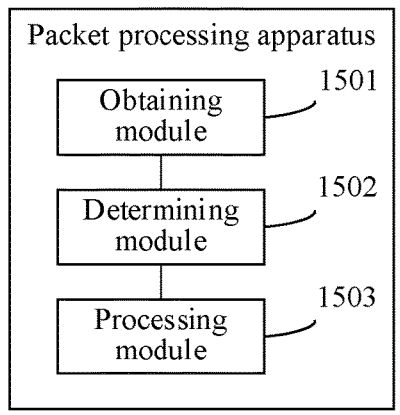
FIG. 15 is a schematic diagram of a structure of a packet processing apparatus according to an embodiment of this application.

The foregoing describes the packet processing method in embodiments of this application. Corresponding to the foregoing method, an embodiment of this application further provides a packet processing apparatus. FIG. 15 is a schematic diagram of a structure of a packet processing apparatus according to an embodiment of this application. The apparatus is applied to a first network device. The first network device is the first network device shown in FIG. 12. Alternatively, the first network device may be the network device 102 shown in FIG. 1 or R1 shown in FIG. 11. Based on a plurality of modules shown as follows in FIG. 15, the packet processing apparatus shown in FIG. 15 can perform all or some operations performed by the first network device. It should be understood that the apparatus may include more additional modules than the modules shown, or some of the modules shown are omitted. This is not limited in embodiments of this application. As shown in FIG. 15, the apparatus includes:

- an obtaining module 1501, configured to obtain a first service packet and a plurality of flow specification FlowSpec rule groups, where any FlowSpec rule group in the plurality of FlowSpec rule groups indicates a rule set for processing a service packet, and different FlowSpec rule groups correspond to different priorities, that is, the obtaining module 1501 is configured to perform step 1201 shown in FIG. 12;
- a determining module 1502, configured to determine a target FlowSpec rule group, where the target FlowSpec rule group is a FlowSpec rule group in the plurality of FlowSpec rule groups that successfully matches the first service packet and that has the highest priority, that is, the determining module 1502 is configured to perform step 1202 shown in FIG. 12; and
- a processing module 1503, configured to process the first service packet according to the target FlowSpec rule group, that is, the processing module 1503 is configured to perform step 1203 shown in FIG. 12.

In a possible implementation, the determining module 1502 is configured to: sort the plurality of FlowSpec rule groups based on priorities of the FlowSpec rule groups, and match the first service packet against a corresponding FlowSpec rule group in a sorted order until the target FlowSpec rule group that is successfully matched is determined.

In a possible implementation, the any FlowSpec rule group includes a rule in the rule set.

In a possible implementation, the obtaining module 1501 is configured to: receive a plurality of rules of a flow specification FlowSpec and first indication information corresponding to the rules that are sent by a second network device, where rules corresponding to same first indication information belong to a same FlowSpec rule group; and group the rules based on the first indication information corresponding to the rules, to obtain at least one FlowSpec rule group.

In a possible implementation, the target FlowSpec rule group corresponds to a plurality of FlowSpec rule sub-groups, and one FlowSpec rule sub-group indicates at least one rule in the rule set.

In a possible implementation, the FlowSpec rule sub-group includes at least one rule in the rule set, and the obtaining module is configured to: receive a plurality of rules of a flow specification FlowSpec and first indication information and second indication information corresponding to the rules that are sent by a second network device, where rules corresponding to same first indication information belong to a same FlowSpec rule group, and rules corresponding to same second indication information in a same FlowSpec rule group belong to a same FlowSpec rule sub-group; group the rules based on the first indication information corresponding to the rules, to obtain the plurality of FlowSpec rule groups; and for any FlowSpec rule group, group rules in the any FlowSpec rule group into at least one FlowSpec rule sub-group based on second indication information corresponding to the rules in the any FlowSpec rule group.

In a possible implementation, the any FlowSpec rule group includes first indication information, and the first indication information corresponds to a rule in the rule set.

In a possible implementation, the target FlowSpec rule group further includes a plurality of FlowSpec rule sub-groups, one FlowSpec rule sub-group includes one piece of second indication information, one FlowSpec rule sub-group indicates at least one rule in the rule set, and the second indication information corresponds to the rules indicated by the FlowSpec rule sub-group to which the second indication information belongs.

In a possible implementation, second indication information corresponding to the any rule is a sub-group identifier of a FlowSpec rule sub-group to which the any rule belongs.

In a possible implementation, first indication information corresponding to any rule is a group identifier of a FlowSpec rule group to which the any rule belongs, and different group identifiers correspond to different priorities.

In a possible implementation, the processing module 1503 is configured to: determine a target rule from a rule set indicated by the target FlowSpec rule group, and process the first service packet based on an action corresponding to the target rule.

In a possible implementation, the processing module 1503 is configured to match, based on that the target FlowSpec rule group includes a plurality of FlowSpec rule sub-groups, the first service packet against the rules indicated by each FlowSpec rule sub-group, and use a rule that is successfully matched as the target rule.

In a possible implementation, each FlowSpec rule sub-group corresponds to one identifier, and the processing module 1503 is configured to: match the first service packet against the rules indicated by any FlowSpec rule sub-group in the target FlowSpec rule group, and in response to that an identifier corresponding to the any FlowSpec rule sub-group has a first value, after a rule that is successfully matched is hit in the rules indicated by the any FlowSpec rule sub-group, terminate a matching operation in the any FlowSpec rule sub-group, and match the first service packet against the rules indicated by a next FlowSpec rule sub-group; and In response to that the identifier corresponding to the any FlowSpec rule sub-group has a second value, after a rule that is successfully matched is hit in the rules indicated by the any FlowSpec rule sub-group, a matching operation continues to be performed in the any FlowSpec rule sub-group until matching operations have been performed on all the rules indicated by the any FlowSpec rule sub-group, and then the first service packet is matched against the rules indicated by a next FlowSpec rule sub-group.

In a possible implementation, the processing module 1503 is configured to: match the first service packet against the rules indicated by any FlowSpec rule sub-group in the target FlowSpec rule group, and in response to that the any FlowSpec rule sub-group does not include an identifier, after a rule that is successfully matched is hit in the rules indicated by the any FlowSpec rule sub-group, terminate a matching operation in the any FlowSpec rule sub-group, and match the first service packet against the rules indicated by a next FlowSpec rule sub-group in the target FlowSpec rule group.

In a possible implementation, the FlowSpec is an application-aware networking APN flow specification; and the processing module 1503 is configured to add APN feature information corresponding to the target rule to the first service packet or an outer tunnel encapsulation of the first service packet, where the APN feature information indicates an application or a user corresponding to the first service packet.

In a possible implementation, the processing module 1503 is configured to add the application-aware networking APN feature information corresponding to the target rule to a reference location of the first service packet or the outer tunnel encapsulation of the first service packet, where the reference location is a location corresponding to the target rule.

In a possible implementation, the apparatus further includes:

a receiving module, configured to receive an IPv6 extension header type or a bitmap sent by the second network device, where the IPv6 extension header type or the bitmap indicates the reference location.

In a possible implementation, when the target FlowSpec rule group includes a plurality of FlowSpec rule sub-groups, the target rule is a plurality of rules that are successfully matched in the plurality of FlowSpec rule sub-groups, and any rule that is successfully matched corresponds to a part of the APN feature information.

In a possible implementation, each of the plurality of rules that are successfully matched corresponds to a part of the APN feature information in a matching order, and the part of the APN feature information includes at least one of an application group ID, an application ID, and a user group.

In a possible implementation, the plurality of FlowSpec rule groups include an APN specification group and a non-APN specification group, a priority of the APN specification group is higher than a priority of the non-APN specification group, and a rule in a rule set indicated by the APN specification group is an application-aware networking APN flow specification.

In a possible implementation, the APN feature information includes an APN attribute, the APN attribute includes at least one of an APN identifier ID and an APN parameter, and the APN ID is an identifier of a whole or an identifier of a fragment.

In a possible implementation, the identifier of the fragment includes at least one of an application group ID, an application ID, and a user group, and the APN parameter includes at least one of bandwidth, a delay, a packet loss rate, and a jitter.

In a possible implementation, the APN feature information is added to a packet header corresponding to an outer tunnel of the first service packet, and the outer tunnel includes an internet protocol version 6 IPv6 tunnel, an internet protocol version 6 segment routing SRv6 tunnel, a multi-protocol label switching MPLS tunnel, a virtual extensible local area network VXLAN tunnel, or a generic routing encapsulation GRE tunnel.

Figure 16:
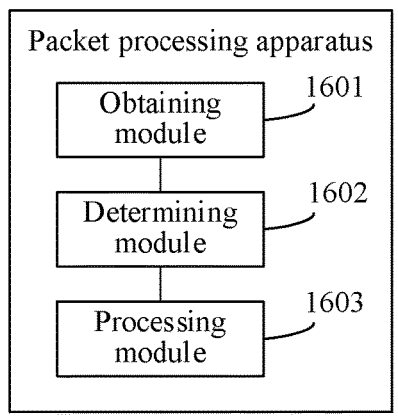
FIG. 16 is a schematic diagram of a structure of a packet processing apparatus according to an embodiment of this application.

Corresponding to the foregoing method, an embodiment of this application further provides a packet processing apparatus. FIG. 16 is a schematic diagram of a structure of a packet processing apparatus according to an embodiment of this application. The apparatus is applied to a first network device. The first network device is the first network device shown in FIG. 14. Alternatively, the first network device may be the foregoing network device 102 shown in FIG. 1 or R1 shown in FIG. 11. Based on a plurality of modules shown as follows in FIG. 16, the packet processing apparatus shown in FIG. 16 can perform all or some operations performed by the first network device. It should be understood that the apparatus may include more additional modules than the modules shown, or some of the modules shown are omitted. This is not limited in embodiments of this application. As shown in FIG. 16, the apparatus includes:

an obtaining module 1601, configured to obtain a first service packet, that is, the obtaining module 1601 is configured to perform step 1401 shown in FIG. 14;

a determining module 1602, configured to determine a target flow specification FlowSpec rule group, where the target FlowSpec rule group includes a plurality of FlowSpec rule sub-groups, and each FlowSpec rule sub-group indicates at least one rule in a rule set, that is, the determining module 1602 is configured to perform step 1402 shown in FIG. 14; and a processing module 1603, configured to: match, in an order of the plurality of FlowSpec rule sub-groups, the first service packet against the rules indicated by each FlowSpec rule sub-group, and process the first service packet based on a matching result, that is, the processing module 1603 is configured to perform step 1403 shown in FIG. 14.

In a possible implementation, the processing module 1603 is configured to process the first service packet based on an action corresponding to a target rule, where the target rule is a rule that is indicated by the plurality of FlowSpec rule sub-groups, that is in the rule set, and that successfully matches the first service packet.

In a possible implementation, the target FlowSpec rule group is a FlowSpec rule group that is in a plurality of FlowSpec rule groups obtained by the first network device, that successfully matches the first service packet, and that has the highest priority.

In a possible implementation, each FlowSpec rule sub-group corresponds to one identifier, and the processing module 1603 is configured to: match the first service packet against the rules indicated by any FlowSpec rule sub-group, and in response to that an identifier corresponding to the any FlowSpec rule sub-group has a first value, after a rule that is successfully matched is hit in the rules indicated by the any FlowSpec rule sub-group, terminate a matching operation in the any FlowSpec rule sub-group, and match the first service packet against the rules indicated by a next FlowSpec rule sub-group; and in response to that the identifier corresponding to the any FlowSpec rule sub-group has a second value, after a rule that is successfully matched is hit in the rules indicated by the any FlowSpec rule sub-group, continue to perform a matching operation in the any FlowSpec rule sub-group until matching operations have been performed on all the rules indicated by the any FlowSpec rule sub-group, and then match the first service packet against the rules indicated by a next FlowSpec rule sub-group.

In a possible implementation, the processing module 1603 is configured to: match the first service packet against the rules indicated by any FlowSpec rule sub-group in the target FlowSpec rule group, and in response to that the any FlowSpec rule sub-group does not include an identifier, after a rule that is successfully matched is hit in the rules indicated by the any FlowSpec rule sub-group, terminate a matching operation in the any FlowSpec rule sub-group, and match the first service packet against the rules indicated by a next FlowSpec rule sub-group in the target FlowSpec rule group.

In a possible implementation, the FlowSpec rule sub-group includes at least one rule in the rule set, and the determining module 1602 is configured to: receive a plurality of rules and first indication information and second indication information corresponding to the rules that are sent by a second network device, where rules corresponding to same first indication information belong to a same FlowSpec rule group, and rules corresponding to same second indication information in a same FlowSpec rule group belong to a same FlowSpec rule sub-group; group the rules based on the first indication information corresponding to the rules, to obtain the target FlowSpec rule group; and group rules in the target FlowSpec rule group into at least one FlowSpec rule sub-group based on second indication information corresponding to the rules in the target FlowSpec rule group.

In a possible implementation, the any FlowSpec rule group includes first indication information, and the first indication information corresponds to a rule in the rule set; and the target FlowSpec rule group further includes a plurality of pieces of second indication information, one piece of second indication information corresponds to one FlowSpec rule sub-group, and one piece of second indication information corresponds to the rules indicated by the FlowSpec rule sub-group to which the second indication information belongs.

In a possible implementation, first indication information corresponding to any rule is a group identifier of a FlowSpec rule group to which the any rule belongs; and second indication information corresponding to the any rule is a sub-group identifier of a FlowSpec rule sub-group to which the any rule belongs.

Figure 17:
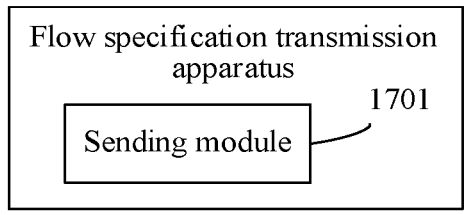
FIG. 17 is a schematic diagram of a structure of a flow specification transmission apparatus according to an embodiment of this application.

Corresponding to the foregoing method, an embodiment of this application further provides a flow specification transmission apparatus. FIG. 17 is a schematic diagram of a structure of a flow specification transmission apparatus according to an embodiment of this application. The apparatus is applied to a second network device. The second network device is the second network device shown in FIG. 7 or FIG. 8. The second network device may be the network device 101 shown in FIG. 1 or the network controller 1 shown in FIG. 11. Based on a plurality of modules shown as follows in FIG. 17, the flow specification transmission apparatus shown in FIG. 17 can perform all or some operations performed by the second network device. It should be understood that the apparatus may include more additional modules than the modules shown, or some of the modules shown are omitted. This is not limited in embodiments of this application. As shown in FIG. 17, the apparatus includes:

a sending module 1701, configured to send a plurality of rules of a flow specification FlowSpec and first indication information corresponding to each rule in the plurality of rules to a first network device, where rules corresponding to same first indication information belong to a same FlowSpec rule group, and different FlowSpec rule groups correspond to different priorities, so that the first network device determines a target FlowSpec rule group from a plurality of FlowSpec rule groups of the FlowSpec in a priority order of FlowSpec rule groups.

In a possible implementation, first indication information corresponding to any rule is a group identifier of a FlowSpec rule group to which the any rule belongs, and different group identifiers correspond to different priorities.

In a possible implementation, the sending module 1701 is further configured to send second indication information corresponding to the rules to the first network device, where rules that are in rules belonging to a same FlowSpec rule group and that correspond to same second indication information belong to a same FlowSpec rule sub-group, so that the first network device traverses FlowSpec rule sub-groups in the same FlowSpec rule group in an order of FlowSpec rule sub-groups.

In a possible implementation, second indication information corresponding to any rule is a sub-group identifier of a FlowSpec rule sub-group to which the any rule belongs, and the sub-group identifier is used for determining the order of the FlowSpec rule sub-groups.

Figure 18:
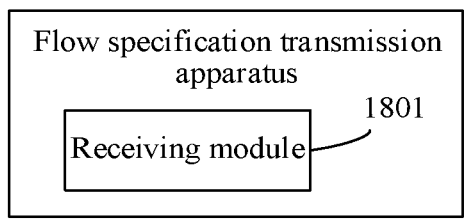
FIG. 18 is a schematic diagram of a structure of a flow specification transmission apparatus according to an embodiment of this application.

Corresponding to the foregoing method, an embodiment of this application further provides a flow specification transmission apparatus. FIG. 18 is a schematic diagram of a structure of a flow specification transmission apparatus according to an embodiment of this application. The apparatus is applied to a first network device, and the first network device is the first network device shown in FIG. 7 or FIG. 8. Based on a plurality of modules shown as follows in FIG. 18, the flow specification transmission apparatus shown in FIG. 18 can perform all or some operations performed by the first network device. It should be understood that the apparatus may include more additional modules than the modules shown, or some of the modules shown are omitted. This is not limited in embodiments of this application. As shown in FIG. 18, the apparatus includes:

a receiving module 1801, configured to receive a plurality of rules of a flow specification FlowSpec and first indication information corresponding to each rule in the plurality of rules that are sent by a second network device, where rules corresponding to same first indication information belong to a same FlowSpec rule group, different FlowSpec rule groups correspond to different priorities, and the priorities are used for determining a target FlowSpec rule group from a plurality of FlowSpec rule groups of the FlowSpec.

In a possible implementation, first indication information corresponding to any rule is a group identifier of a FlowSpec rule group to which the any rule belongs, and different group identifiers correspond to different priorities.

In a possible implementation, the receiving module 1801 is further configured to receive second indication information corresponding to each rule sent by the second network device, where rules that are in rules belonging to a same FlowSpec rule group and that correspond to same second indication information belong to a same FlowSpec rule sub-group, and the second indication information is used for determining a FlowSpec rule sub-group, and traversing FlowSpec rule sub-groups in the same FlowSpec rule group in an order of FlowSpec rule sub-groups.

In a possible implementation, second indication information corresponding to the any rule is a sub-group identifier of a FlowSpec rule sub-group to which the any rule belongs.

Figure 19:
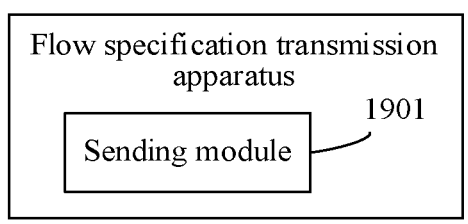
FIG. 19 is a schematic diagram of a structure of a flow specification transmission apparatus according to an embodiment of this application.

Corresponding to the foregoing method, an embodiment of this application further provides a flow specification transmission apparatus. FIG. 19 is a schematic diagram of a structure of a flow specification transmission apparatus according to an embodiment of this application. The apparatus is applied to a second network device. The second network device is the second network device shown in FIG. 9. The second network device may be the network device 101 shown in FIG. 1 or the network controller 1 shown in FIG. 11. Based on a plurality of modules shown as follows in FIG. 19, the flow specification transmission apparatus shown in FIG. 19 can perform all or some operations performed by the second network device. It should be understood that the apparatus may include more additional modules than the modules shown, or some of the modules shown are omitted. This is not limited in embodiments of this application. As shown in FIG. 19, the apparatus includes:

a sending module 1901, configured to send a plurality of rules of a flow specification FlowSpec and first indication information and second indication information corresponding to each rule in the plurality of rules to a first network device, where rules corresponding to same first indication information belong to a same Flow Spec rule group, and rules corresponding to same second indication information in the rules belonging to the same FlowSpec rule group belong to a same FlowSpec rule sub-group, so that the first network device determines the FlowSpec rule group based on the first indication information, determines the FlowSpec rule sub-group based on the second indication information, and traverses all FlowSpec rule sub-groups in the same FlowSpec rule group in an order of FlowSpec rule sub-groups.

In a possible implementation, first indication information corresponding to any rule is a group identifier of a FlowSpec rule group to which the any rule belongs, and different group identifiers correspond to different priorities, so that the first network device determines a target FlowSpec rule group from a plurality of FlowSpec rule groups of the FlowSpec in a priority order of FlowSpec rule groups.

In a possible implementation, second indication information corresponding to any rule is a sub-group identifier of a FlowSpec rule sub-group to which the any rule belongs, and the sub-group identifier is used for determining the order of the FlowSpec rule sub-groups.

Figure 20:
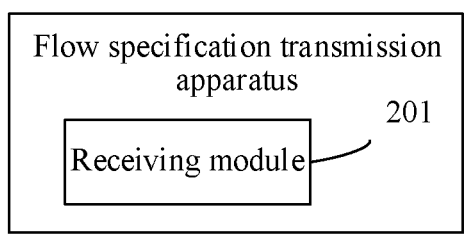
FIG. 20 is a schematic diagram of a structure of a flow specification transmission apparatus according to an embodiment of this application.

Corresponding to the foregoing method, an embodiment of this application further provides a flow specification transmission apparatus. FIG. 20 is a schematic diagram of a structure of a flow specification transmission apparatus according to an embodiment of this application. The apparatus is applied to a first network device, and the first network device is the first network device shown in FIG. 10. Based on a plurality of modules shown as follows in FIG. 20, the flow specification transmission apparatus shown in FIG. 20 can perform all or some operations performed by the first network device. It should be understood that the apparatus may include more additional modules than the modules shown, or some of the modules shown are omitted. This is not limited in embodiments of this application. As shown in FIG. 20, the apparatus includes:

a receiving module 201, configured to receive a plurality of rules of a flow specification FlowSpec and first indication information and second indication information corresponding to each rule in the plurality of rules that are sent by a second network device, where rules corresponding to same first indication information belong to a same FlowSpec rule group, and rules corresponding to same second indication information in the rules belonging to the same FlowSpec rule group belong to a same FlowSpec rule sub-group; and the first indication information is used by the first network device to determine the FlowSpec rule group, and the second indication information is used by the first network device to determine a FlowSpec rule sub-group, and traverse FlowSpec rule sub-groups in the same FlowSpec rule group in an order of FlowSpec rule sub-groups.

In a possible implementation, first indication information corresponding to any rule is a group identifier of a FlowSpec rule group to which the any rule belongs, different group identifiers correspond to different priorities, and the priorities are used for determining a target FlowSpec rule group from a plurality of FlowSpec rule groups of the FlowSpec in a priority order of FlowSpec rule groups.

In a possible implementation, second indication information corresponding to any rule is a sub-group identifier of a FlowSpec rule sub-group to which the any rule belongs, and the sub-group identifier is used for determining the order of the FlowSpec rule sub-groups.

It should be understood that, when the apparatuses provided in FIG. 15 to FIG. 20 implement functions of the apparatuses, division into the foregoing functional modules is merely used as an example for description. In actual application, the foregoing functions may be allocated to different functional modules for implementation as required. In other words, a device is divided into different functional modules in terms of an inner structure, to implement all or some of the functions described above. In addition, the apparatus provided in the foregoing embodiments and the method embodiments belong to a same concept. For a specific implementation process of the apparatus, refer to the method embodiments. Details are not described herein again.

Figure 21:
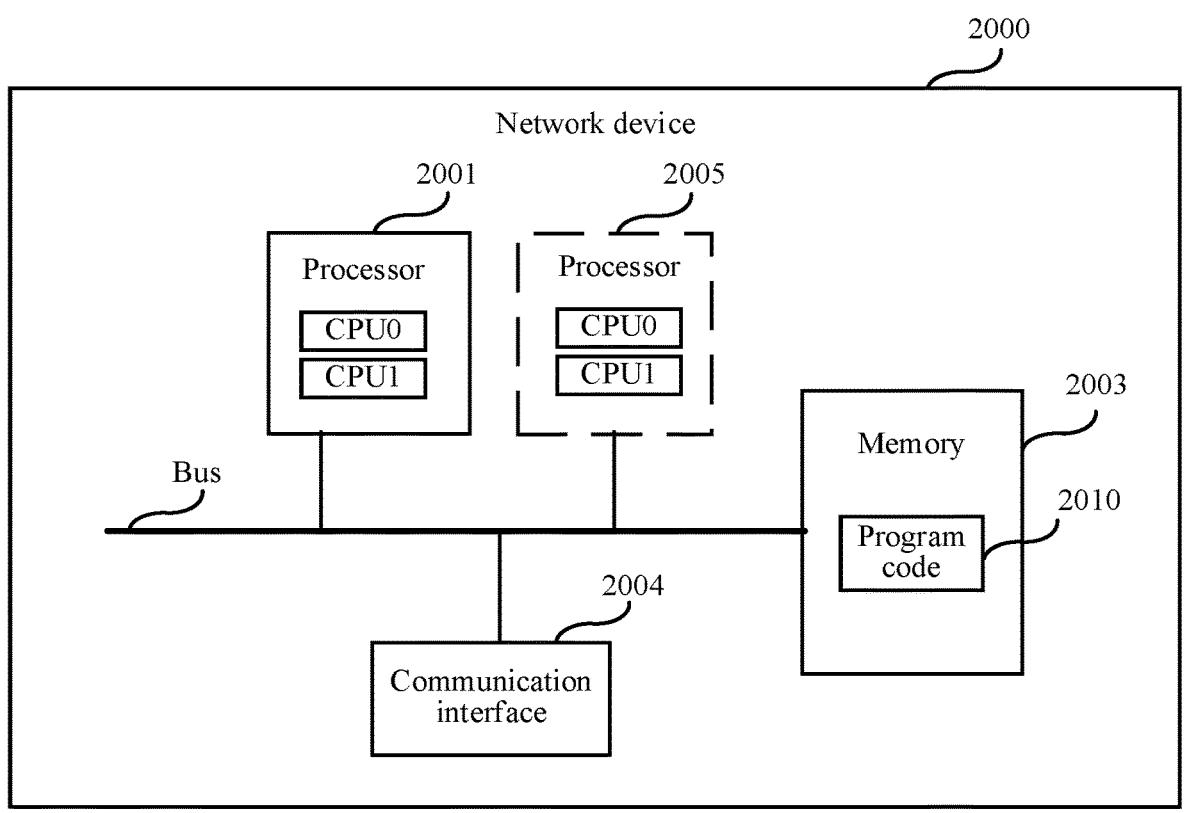
FIG. 21 is a schematic diagram of a structure of a network device according to an embodiment of this application.

FIG. 21 is a schematic diagram of a structure of a network device 2000 according to an example embodiment of this application. The network device 2000 shown in FIG. 21 is configured to perform operations in the method shown in FIG. 7, FIG. 8, FIG. 10, FIG. 12, or FIG. 14. The network device 2000 is, for example, a switch, a router, or a network controller. The network device 2000 may be implemented through a general bus architecture.

As shown in FIG. 21, the network device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. For example, the PLD is a complex programmable logic device (CPLD), a field-programmable logic gate array (FPGA), a generic array logic (GAL), or any combination thereof. The processor may implement or execute various logical blocks, modules, and circuits described with reference to content disclosed in embodiments of the present invention. The processor may be a combination of processors implementing a computing function, for example, a combination of one or more microprocessors, or a combination of the DSP and a microprocessor.

Optionally, the network device 2000 further includes a bus. The bus is configured to transmit information between components of the network device 2000. The bus may be a peripheral component interconnect (PCI for short) bus, an extended industry standard architecture (EISA for short) bus, or the like. The bus may be classified into an address bus, a data bus, a control bus, and the like. For ease of representation, only one bold line is used to represent the bus in FIG. 21, but this does not mean that there is only one bus or only one type of bus.

The memory 2003 may be, for example, a read-only memory or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or a data structure and capable of being accessed by a computer. This is not limited thereto. The memory 2003 exists independently, for example, and is connected to the processor 2001 by a bus. The memory 2003 may be integrated with the processor 2001.

The communication interface 2004 uses any apparatus such as a transceiver, and is configured to communicate with another device or a communication network. The communication network may be an Ethernet, a radio access network (RAN), a wireless local area network (WLAN), or the like. The communication interface 2004 may include a wired communication interface, and may further include a wireless communication interface. Specifically, the communication interface 2004 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 2004 may be used by the network device 2000 to communicate with another device.

In a specific implementation, in an embodiment, the processor 2001 may include one or more CPUs, for example, a CPU 0 and a CPU 1 shown in FIG. 21. Each of the processors may be a single-core (e.g., a single-CPU) processor, or may be a multi-core (e.g., a multi-CPU) processor. The processor herein may be one or more devices, circuits, and/or processing cores configured to process data (for example, computer program instructions).

During specific implementation, in an embodiment, the network device 2000 may include a plurality of processors, for example, the processor 2001 and a processor 2005 shown in FIG. 21. Each of the processors may be a single-core processor (e.g., a single-CPU) or may be a multi-core processor (e.g., a multi-CPU). The processor herein may refer to one or more devices, circuits, and/or processing cores configured to process data (for example, a computer program instruction).

In a specific implementation, in an embodiment, the network device 2000 may further include an output device and an input device. The output device communicates with the processor 2001, and may display information in a plurality of manners. For example, the output device may be a liquid crystal display (LCD), a light emitting diode (LED) display device, a cathode ray tube (CRT) display device, a projector, or the like. The input device communicates with the processor 2001, and may receive an input of a user in a plurality of manners. For example, the input device may be a mouse, a keyboard, a touchscreen device, or a sensing device.

In some embodiments, the memory 2003 is configured to store program code 2010 for performing the solutions of this application, and the processor 2001 may execute the program code 2010 stored in the memory 2003. In other words, the network device 2000 may implement, by using the processor 2001 and the program code 2010 in the memory 2003, the packet processing method or the flow specification transmission provided in the method embodiments. The program code 2010 may include one or more software modules. Optionally, the processor 2001 may also store program code or instructions for executing the solutions of this application.

In a specific embodiment, the network device 2000 in this embodiment of this application may correspond to the first network device in the foregoing method embodiments. The processor 2001 in the network device 2000 reads the instructions in the memory 2003, so that the network device 2000 shown in FIG. 21 can perform all or some operations performed by the first network device. For example, the network device 2000 may be the network device 102 shown in FIG. 1 or R1 shown in FIG. 11.

In another example, the network device 2000 in this embodiment of this application may correspond to the second network device in the foregoing method embodiments. The processor 2001 in the network device 2000 reads the instructions in the memory 2003, so that the network device 2000 shown in FIG. 21 can perform all or some operations performed by the second network device. For example, the network device 2000 may be the network device 101 shown in FIG. 1 or the network controller 1 shown in FIG. 11.

The network device 2000 may further correspond to the packet processing apparatus shown in FIG. 15 and FIG. 16, and each functional module in the packet processing apparatus is implemented by using software of the network device 2000. In other words, the functional modules included in the packet processing apparatus are generated after the processor 2001 of the network device 2000 reads the program code 2010 stored in the memory 2003.

Steps of the packet processing method shown in FIG. 15 and FIG. 16 are implemented by using an integrated logic circuit of hardware in a processor of the network device 2000, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory. The processor reads information in the memory, and completes the steps of the foregoing methods in combination with hardware of the processor. To avoid repetition, details are not described herein again.

The network device 2000 may further correspond to the flow specification transmission apparatus shown in FIG. 17 to FIG. 20, and each functional module in the flow specification transmission apparatus is implemented by using software of the network device 2000. In other words, the functional modules included in the flow specification transmission apparatus are generated after the processor 2001 of the network device 2000 reads the program code 2010 stored in the memory 2003.

Steps of the flow specification transmission method shown in FIG. 17 to FIG. 20 are implemented by using an integrated logic circuit of hardware in a processor of the network device 2000, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory. The processor reads information in the memory, and completes the steps of the foregoing methods in combination with hardware of the processor. To avoid repetition, details are not described herein again.

Figure 22:
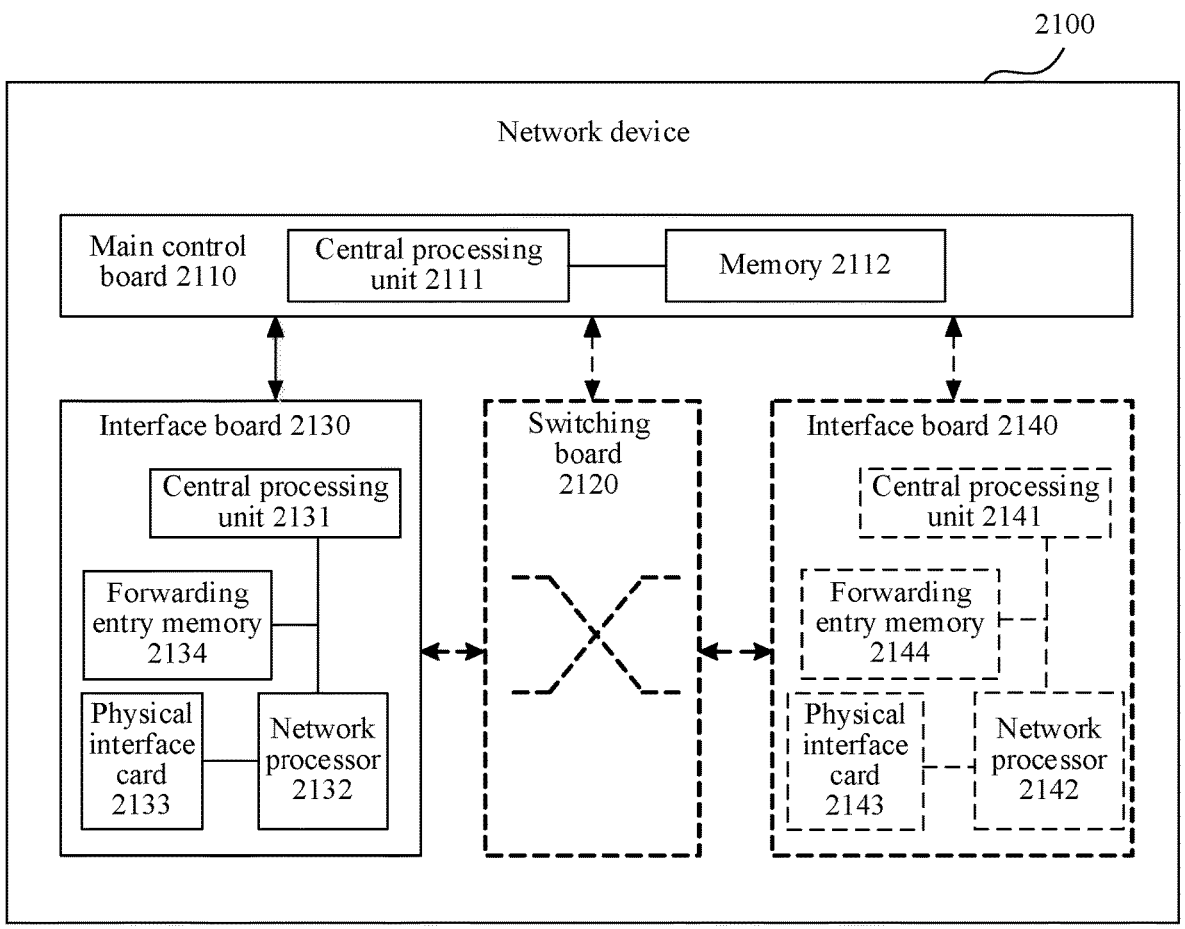
FIG. 22 is a schematic diagram of a structure of a network device according to an embodiment of this application.

FIG. 22 is a schematic diagram of a structure of a network device 2100 according to another example embodiment of this application. The network device 2100 shown in FIG. 22 is configured to perform all or some operations in the flow specification transmission method or the packet processing method in FIG. 7, FIG. 8, FIG. 10, FIG. 12, or FIG. 14. The network device 2100 is, for example, a switch or a router. For example, the network device 2000 may be the network device 102 shown in FIG. 1 or R1 shown in FIG. 11. The network device 2100 may be implemented through a general bus architecture.

As shown in FIG. 22, the network device 2100 includes a main control board 2110 and an interface board 2130.

The main control board is also referred to as a main processing unit (MPU) or a route processor card. The main control board 2110 is configured to control and manage components in the network device 2100, including functions of route calculation, device management, device maintenance, and protocol processing. The main control board 2110 includes a central processing unit 2111 and a memory 2112.

The interface board 2130 is also referred to as a line interface unit card (LPU), a line card (line card), or a service board. The interface board 2130 is configured to: provide various service interfaces, and implement forwarding of a data packet. The service interface includes, but is not limited to, an Ethernet interface, a POS (Packet over SONET/SDH) interface, and the like. The Ethernet interface is, for example, a flexible Ethernet service interface (Flexible Ethernet Clients, FlexE Clients). The interface board 2130 includes a central processing unit 2131, a network processor 2132, a forwarding entry memory 2134, and a physical interface card (PIC) 2133.

The central processing unit 2131 on the interface board 2130 is configured to control and manage the interface board 2130, and communicate with the central processing unit 2111 on the main control board 2110.

The network processor 2132 is configured to implement packet forwarding. A form of the network processor 2132 may be a forwarding chip. The forwarding chip may be a network processor (NP). In some embodiments, the forwarding chip may be implemented by using an application-specific integrated circuit (ASIC) or a field programmable gate array (FPGA). Specifically, the network processor 2132 is configured to forward a received packet based on the forwarding table stored in the forwarding entry memory 2134, and if a destination address of the packet is an address of the network device 2100, send the packet to a CPU (for example, a central processing unit 2131) for processing. If the destination address of the packet is not the address of the network device 2100, a next hop and an outbound interface corresponding to the destination address are found in the forwarding table based on the destination address, and the packet is forwarded to the outbound interface corresponding to the destination address. The processing of the uplink packet may include: processing of a packet inbound interface and forwarding table lookup. The processing of the downlink packet may include forwarding table lookup, and the like. In some embodiments, the central processing unit may also perform a function of a forwarding chip, for example, implement software forwarding based on a general-purpose CPU, so that the interface board does not require a forwarding chip.

The physical interface card 2133 is configured to implement a physical layer interconnection function. Original traffic enters the interface board 2130, and a processed packet is sent out from the physical interface card 2133. The physical interface card 2133, also referred to as a subcard, may be installed on the interface board 2130, and is responsible for converting an optical/electrical signal into a packet, performing a validity check on the packet, and then forwarding the packet to the network processor 2132 for processing. In some embodiments, the central processing unit 2131 may execute a function of the network processor 2132, for example, implement software forwarding based on a general-purpose CPU, so that the physical interface card 2133 does not require the network processor 2132.

Optionally, the network device 2100 includes a plurality of interface boards. For example, the network device 2100 further includes an interface board 2140. The interface board 2140 includes a central processing unit 2141, a network processor 2142, a forwarding entry memory 2144, and a physical interface card 2143. Functions and implementations of components in the interface board 2140 are the same as or similar to those of the interface board 2130, and details are not described herein again.

Optionally, the network device 2100 further includes a switching board 2120. The switching board 2120 may also be referred to as a switch fabric unit (SFU). When the network device has a plurality of interface boards, the switching board 2120 is configured to complete data exchange between the interface boards. For example, the interface board 2130 and the interface board 2140 may communicate with each other through the switching board 2120.

The main control board 2110 is coupled to the interface board. For example, the main control board 2110, the interface board 2130, the interface board 2140, and the switching board 2120 are connected to a system backplane by a system bus to implement interworking. In a possible implementation, an inter-process communication protocol (IPC) channel is established between the main control board 2110 and the interface board 2130 and the interface board 2140, and the main control board 2110 communicates with the interface board 2130 and the interface board 2140 through an inter-process communication (IPC) channel.

Logically, the network device 2100 includes a control plane and a forwarding plane. The control plane includes the main control board 2110 and the central processing unit 2111, and the forwarding plane includes components for performing forwarding, for example, the forwarding entry memory 2134, the physical interface card 2133, and the network processor 2132. The control plane performs functions such as a router, generating a forwarding table, processing a signaling and protocol packet, and configuring and maintaining a status of a network device. The control plane delivers the generated forwarding table to the forwarding plane. On the forwarding plane, the network processor 2132 searches a table based on the forwarding table delivered by the control plane to forward a packet received by the physical interface card 2133. The forwarding table delivered by the control plane may be stored in the forwarding entry memory 2134. In some embodiments, the control plane and the forwarding plane may be completely separated, and are not on a same network device.

It should be noted that, there may be one main control board or a plurality of main control boards when there are the plurality of main control boards, the main control boards may include an active main control board and a standby main control board. There may be one or more interface boards, and a network device having a stronger data processing capability provides more interface boards. There may also be one or more physical interface cards on the interface board. There may be no switching board, or one or more switching boards. When there are a plurality of switching boards, load sharing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is performed by using the switching board, to provide large-capacity data exchange and processing capability. Therefore, a data access and processing capability of a network device in a distributed architecture is greater than that of a network device in a centralized architecture. Optionally, a form of the network device may be only one card. In other words, there is no switching board, and functions of the interface board and the main control board are integrated on the card. In this case, a central processing unit on the interface board and a central processing unit on the main control board may be combined into one central processing unit on the card, to perform functions obtained after the two central processing units are combined. A network device in this form (for example, a network device such as a low-end switch or router) has a weak data exchange and processing capability. A specific architecture that is to be used depends on a specific networking deployment scenario. This is not limited herein.

Figure 23:
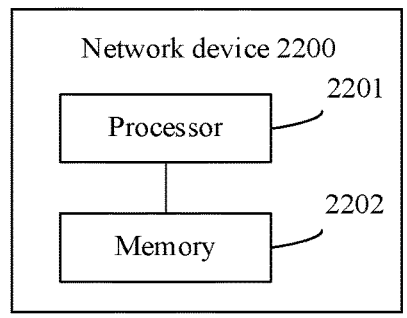
FIG. 23 is a schematic diagram of a structure of a network device according to an embodiment of this application.

FIG. 23 is a schematic diagram of a structure of another network device 2200 according to an embodiment of this application. The network device 2200 may differ greatly due to different configurations or performance, and may include one or more processors (CPU) 2201 and one or more memories 2202. The one or more memories 2202 store at least one computer program, and the at least one computer program is loaded and executed by the one or more processors 2201, so that a server implements the packet processing method or the flow specification transmission method provided in the foregoing method embodiments. Certainly, the network device 2200 may further have components such as a wired or wireless network interface, a keyboard, and an input/output interface, to perform input/output. The network device 2200 may further include another component configured to implement a device function. Details are not described herein.

Based on the network devices shown in FIG. 21, FIG. 22, and FIG. 23, an embodiment of this application further provides a communication system. The communication system includes a first network device and a second network device. Optionally, the first network device is the network device 2000 shown in FIG. 21, the network device 2100 shown in FIG. 22, or the network device 2200 shown in FIG. 23, and the second network device is the network device 2000 shown in FIG. 21, the network device 2100 shown in FIG. 22, or the network device 2200 shown in FIG. 23.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform a method that needs to be performed by the first network device.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform a method that needs to be performed by a remote server.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform a method that needs to be performed by the second network device.

It should be understood that the processor may be a CPU, or may be another general-purpose processor, a digital signal processor (DSP), an application-specific integrated circuit (ASIC), a field-programmable gate array (FPGA), or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computer machines (ARM) architecture.

Further, in an optional embodiment, the memory may include a read-only memory and a random access memory, and provide instructions and data to the processor. The memory may further include a nonvolatile random access memory. For example, the memory may further store information of a device type.

The memory may be a volatile memory or a nonvolatile memory, or may include both a volatile memory and a nonvolatile memory. The nonvolatile memory may be a read-only memory, a programmable read-only memory (PROM), an erasable programmable read-only memory, an electrically erasable programmable read-only memory, or a flash memory. The volatile memory may be a random access memory, used as an external cache. As illustrated by way of example but not limitation, many forms of RAMs are available. For example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous-link dynamic random access memory (SLDRAM), and a direct memory bus random access memory (DR RAM).

An embodiment of this application further provides a computer-readable storage medium. The storage medium stores at least one instruction, and the instruction is loaded and executed by a processor, so that a computer implements any one of the foregoing packet processing method or flow specification transmission method.

An embodiment of this application further provides a computer program (or a computer program product). When the computer program is executed by a computer, a processor or the computer may be enabled to perform corresponding steps and/or procedures in the foregoing method embodiments.

An embodiment of this application further provides a chip, including a processor, configured to invoke, from a memory, and run instructions stored in the memory, so that a communication device in which the chip is installed performs any one of the foregoing packet processing method or flow specification transmission method.

An embodiment of this application further provides another chip, including an input interface, an output interface, a processor, and a memory. The input interface, the output interface, the processor, and the memory are connected by an internal connection path. The processor is configured to execute code in the memory. When the code is executed, the processor is configured to perform any one of the foregoing packet processing method or flow specification transmission method.

An embodiment of this application further provides a communication system. The communication system includes a first network device and a second network device. The first network device is configured to perform the method performed by the first network device in any one of FIG. 7, FIG. 8, FIG. 10, FIG. 12, and FIG. 14. The second network device is configured to perform the method performed by the second network device in any one of FIG. 7, FIG. 8, FIG. 10, FIG. 12, and FIG. 14.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or any other programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may be aware that, in combination with the method steps and modules described in the embodiments disclosed in this specification, the method steps and modules may be implemented by software, hardware, firmware, or any combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

A person of ordinary skill in the art may understand that all or some of the steps of the embodiments may be implemented by hardware or a program instructing related hardware. The program may be stored in a computer-readable storage medium. The foregoing storage medium may be a read-only memory, a magnetic disk, or an optical disc.

When software is used to implement the embodiments, all or a part of the embodiments may be implemented in a form of a computer program product. The computer program product includes one or more computer program instructions. For example, the method in embodiments of this application may be described in context of machine-executable instructions, and the machine-executable instructions are included in, for example, a program module executed in a device on a real or virtual processor of a target. Generally, a program module includes a routine, a program, a library, an object, a class, a component, a data structure, and the like. The program module performs a specific task or implements a specific abstract data structure. In various embodiments, the functions of the program modules may be combined or split between the described program modules. Machine-executable instructions for a program module may be executed locally or within a distributed device. In a distributed device, a program module may be located in both a local and a remote storage medium.

Computer program code used to implement the method in embodiments of this application may be written by using one or more programming languages. The computer program code may be provided for a processor of a general-purpose computer, a dedicated computer, or another programmable data processing apparatus, so that when the program code is executed by the computer or the another programmable data processing apparatus, a function/operation specified in the flowchart and/or the block diagram is implemented. The program code may be completely executed on a computer, partially executed on a computer, independently executed as a software package, partially executed on a computer and partially executed on a remote computer, or completely executed on a remote computer or server.

In the context of embodiments of this application, computer program code or related data may be carried in any appropriate carrier, so that the device, the apparatus, or the processor can perform various processing and operations described above. Examples of carriers include signals, computer-readable media, and the like.

Examples of signals may include electrical, optical, radio, sound, or other forms of propagation signals, such as a carrier, infrared, and the like.

The machine-readable medium may be any tangible medium that includes or stores a program for or has a program relating to an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More detailed examples of machine-readable storage media include electrical connections with one or more wires, portable computer disks, hard disks, random access memories, read-only memories, erasable programmable read-only memories (EPROM or flash memory), optical storage devices, magnetic storage devices, or any suitable combination thereof.

It can be clearly understood by a person skilled in the art that, for the purpose of convenient and brief description, as for a specific working process of the foregoing system, device, and unit, refer to the corresponding process in the foregoing method embodiments, and the details are not described herein again.

In the several embodiments provided in this application, it should be understood that the disclosed system, device, and method may be implemented in other manners. For example, the device embodiment described above is merely an example. For example, the division of units is merely a division of logical functions and there may be other division modes in actual applications. For example, a plurality of modules or components may be combined or may be integrated into another system, or some features may be ignored or not executed. In addition, the shown or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, that is, may be located in one position, or may be distributed on a plurality of network modules. Some or all of the modules may be selected according to actual requirements to achieve the objectives of the solutions of embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) to perform all or some of the steps of the methods described in embodiments of this application. The foregoing storage medium includes various media that can store program code, for example, a USB flash drive, a removable hard disk, a read-only memory, a random access memory, a magnetic disk, or an optical disc.

In this application, terms such as "first" and "second" are used to distinguish between same items or similar items that have basically same functions. It should be understood that there is no logical or time order dependency between "first", "second", and "nth", and a quantity and an execution order are not limited. It should also be understood that although the following description uses terms such as first and second to describe various components, these components should not be limited by the terms. These terms are merely used to distinguish one component from another. For example, a first image may be referred to as a second image without departing from the scope of the various examples, and similarly, a second image may be referred to as a first image. Both the first image and the second image may be images, and in some cases may be separate and different images.

It should be further understood that order numbers of the processes do not mean execution orders in embodiments of this application. The execution orders of the processes should be determined based on functions and internal logic of the processes, and should not be construed as any limitation on the implementation processes of embodiments of this application.

The term "at least one" in this application means one or more, and the term "a plurality of" in this application means two or more. For example, a plurality of second packets means two or more second packets. The terms "system" and "network" are often used interchangeably in this specification.

It should be understood that the terms used in the description of the various examples herein are merely intended to describe specific examples and are not intended to constitute a limitation. "One" ("a" and "an") and "the" of singular forms used in the descriptions of the various examples and the appended claims are also intended to include plural forms, unless otherwise specified in the context clearly.

It should be further understood that the term "and/or" used in this specification refers to and covers any and all possible combinations of one or more associated listed items. The term "and/or" is only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should further be understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should be further understood that the term "if" may be explained as "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined based on A only, and B may be further determined based on A and/or other information.

It should be further understood that "one embodiment", "an embodiment", and "a possible implementation" mentioned in the entire specification mean that a particular feature, structure, or characteristics related to the embodiment or the implementation is included in at least one embodiment of this application. Therefore, "in one embodiment", "in an embodiment", or "a possible implementation" that appears throughout the specification does not necessarily refer to a same embodiment. In addition, these particular features, structures, or characteristics may be combined in one or more embodiments in any appropriate manner.

What is claimed is:

1. A network device, comprising:
one or more memories configured to store instructions; and
one or more processors coupled to the one or more memories and configured to execute the instructions, wherein execution of the instructions causes the network device to:
obtain a first service packet and a plurality of flow specification (FlowSpec) rule groups, wherein at least one FlowSpec rule group in the plurality of FlowSpec rule groups indicates a rule set utilized in processing a service packet, and each different FlowSpec rule group corresponds to at least one different priority, wherein each rule, of a plurality of rules, of each FlowSpec rule group is grouped into a respective FlowSpec rule group according to first indication information that is received from a second network device and that corresponds to the plurality of rules;
determine a target FlowSpec rule group from the plurality of FlowSpec rule groups, wherein the target FlowSpec rule group successfully matches the first service packet and is associated with a highest priority of the plurality of FlowSpec rule groups; and
process the first service packet according to the target FlowSpec rule group.

2. The network device according to claim 1, wherein executing the instructions further causes the network device to:
sort the plurality of FlowSpec rule groups based on at least one priority of each FlowSpec rule group of the plurality of FlowSpec rule groups; and
match the first service packet against a corresponding FlowSpec rule group in a sorted order until the target FlowSpec rule group is successfully matched.

3. The network device according to claim 1, wherein the at least one FlowSpec rule group comprises a rule in the rule set.

4. The network device according to claim 3, wherein executing the instructions further causes the network device to:
receive the plurality of rules of a FlowSpec and the first indication information, wherein the first indication information corresponds to the rules that are sent by a second network device, and wherein each rule corresponding to the first indication information belong to a same FlowSpec rule group; and
group the plurality of rules into the plurality of FlowSpec rule groups, the plurality of rules are grouped based on the first indication information corresponding to the plurality of rules.

5. The network device according to claim 4, wherein first indication information corresponding to a rule comprises a group identifier of a corresponding FlowSpec rule group to which the rule belongs, and different group identifiers correspond to the at least one different priority.

6. The network device according to claim 1, wherein the target FlowSpec rule group corresponds to a plurality of FlowSpec rule sub-groups, and a FlowSpec rule sub-group indicates at least one rule in the rule set.

7. The network device according to claim 6, wherein the FlowSpec rule sub-group comprises the at least one rule in the rule set, and wherein executing the instructions further causes the network device to:
receive a plurality of rules of a FlowSpec rule group;
receive the first indication information and second indication information corresponding to the plurality of rules that are sent by a second network device, wherein at least one rule corresponding to the first indication information belong to a same FlowSpec rule group, and at least one rule corresponding to the second indication information in a same FlowSpec rule group belong to a same FlowSpec rule sub-group;
group the plurality of rules into the plurality of FlowSpec rule groups, wherein the plurality of rules is grouped based on the first indication information corresponding to the rules; and
for at least the FlowSpec rule group, group the plurality of rules in the FlowSpec rule group into at least one FlowSpec rule sub-group based on the second indication information corresponding to the plurality of rules in the FlowSpec rule group.

8. The network device according to claim 7, wherein the second indication information corresponding to a rule comprises a sub-group identifier of a FlowSpec rule sub-group to which the rule belongs.

9. The network device according to claim 1, wherein the at least one FlowSpec rule group comprises the first indication information, and the first indication information corresponds to a rule in the rule set.

10. The network device according to claim 9, wherein the target FlowSpec rule group further comprises a plurality of FlowSpec rule sub-groups, a FlowSpec rule sub-group comprises a piece of second indication information, at least one FlowSpec rule sub-group of the plurality of FlowSpec rule sub-groups indicates at least one rule in the rule set, and the second indication information corresponds to the at least one rule indicated by the FlowSpec rule sub-group to which the second indication information belongs.

11. The network device according to claim 1, wherein executing the instructions further causes the network device to:
determine a target rule from a rule set indicated by the target FlowSpec rule group; and
process the first service packet based on an action corresponding to the target rule.

12. The network device according to claim 11, wherein executing the instructions further causes the network device to:
based on determining that the target FlowSpec rule group comprises a plurality of FlowSpec rule sub-groups, match the first service packet against rules indicated by each FlowSpec rule sub-group until a rule is successfully matched, the rule that is successfully matched is used as the target rule.

13. The network device according to claim 12, wherein each FlowSpec rule sub-group corresponds to an identifier, and wherein executing the instructions further causes the network device to:
match the first service packet against a first at least one rule indicated by a FlowSpec rule sub-group in the target FlowSpec rule group;
in response to determining that a first identifier corresponding to the FlowSpec rule sub-group comprises a first value, and after a first rule is successfully matched in the first at least one rule indicated by the FlowSpec rule sub-group:

terminate a matching operation in the FlowSpec rule sub-group; and match the first service packet against a second at least one rule indicated by a next FlowSpec rule sub-group; and in response to determining that the first identifier corresponding to the FlowSpec rule sub-group comprises a second value, and after a second rule is successfully matched in the first at least one rule indicated by the FlowSpec rule sub-group:

continue to perform a matching operation in the FlowSpec rule sub-group until matching operations have been performed on all the first at least one rule indicated by the FlowSpec rule sub-group; and match the first service packet against the second at least one rule indicated by the next FlowSpec rule sub-group.

14. The network device according to claim 13, wherein executing the instructions further causes the network device to:

match the first service packet against first at least one rule indicated by a FlowSpec rule sub-group in the target FlowSpec rule group; and in response to determining that the FlowSpec rule sub-group does not comprise an identifier, and after a rule is successfully matched in the first at least one rule indicated by the FlowSpec rule sub-group:

terminate the matching operation in the FlowSpec rule sub-group; and match the first service packet against second at least one rule indicated by a next FlowSpec rule sub-group in the target FlowSpec rule group.

15. The network device according to claim 11, wherein the FlowSpec comprises an application-aware networking (APN) flow specification, and wherein executing the instructions further causes the network device to:

add APN feature information corresponding to the target rule to the first service packet, wherein the APN feature information indicates an application or a user corresponding to the first service packet.

16. A network device, comprising:

one or more memories configured to store instructions; and one or more processors coupled to the one or more memories and configured to execute the instructions, wherein execution of the instructions causes the network device to:

obtain a first service packet;

determine a target flow specification (FlowSpec) rule group, wherein the target FlowSpec rule group comprises a plurality of FlowSpec rule sub-groups, and each FlowSpec rule sub-group indicates at least one rule in a rule set, wherein each rule, of a plurality of rules, of each FlowSpec rule group is grouped into a respective FlowSpec rule group according to first indication information that is received from a second network device and that corresponds to the plurality of rules; and match, in an order of the plurality of FlowSpec rule sub-groups, the first service packet against the at least one rule indicated by each FlowSpec rule sub-group; and process the first service packet based on a matching result.

17. The network device according to claim 16, wherein executing the instructions further causes the network device to:

process the first service packet based on an action corresponding to a target rule in the rule set, wherein the target rule is indicated by the plurality of FlowSpec rule sub-groups, the target rule successfully matches the first service packet.

18. The network device according to claim 16, wherein the network device obtains a plurality of FlowSpec rule groups, wherein the plurality of FlowSpec rule groups comprises the target FlowSpec rule group, the target FlowSpec rule group successfully matches the first service packet, and the target FlowSpec rule group has a highest priority.

19. The network device according to claim 16, wherein each FlowSpec rule sub-group corresponds to an identifier, and wherein executing the instructions further causes the network device to:

match the first service packet against a first at least one rule indicated by a FlowSpec rule sub-group;

in response to determining that an identifier corresponding to the FlowSpec rule sub-group comprises a first value, and after a rule is successfully matched in the first at least one rule indicated by the FlowSpec rule sub-group:

terminate a matching operation in the FlowSpec rule sub-group; and match the first service packet against a second at least one rule indicated by a next FlowSpec rule sub-group; and in response to determining that the identifier corresponding to the FlowSpec rule sub-group comprises a second value, and after a rule is successfully matched in the first at least one rule indicated by the FlowSpec rule sub-group:

continue to perform a matching operation in the FlowSpec rule sub-group until matching operations have been performed on all the first at least one rule indicated by the FlowSpec rule sub-group; and match the first service packet against a second at least one rule indicated by the next FlowSpec rule sub-group.

20. A method, comprising:

obtaining, by a first network device, a first service packet and a plurality of flow specification (FlowSpec) rule groups, wherein at least one FlowSpec rule group in the plurality of FlowSpec rule groups indicates a rule set utilized in processing a service packet, and each different FlowSpec rule group corresponds to at least one different priority, wherein each rule, of a plurality of rules, of each FlowSpec rule group is grouped into a respective FlowSpec rule group according to first indication information that is received from a second network device and that corresponds to the plurality of rules;

determining, by the first network device and from the plurality of FlowSpec rule groups, a target FlowSpec rule group, wherein the target FlowSpec rule group successfully matches the first service packet and has a highest priority of the plurality of FlowSpec rule groups; and processing, by the first network device, the first service packet according to the target FlowSpec rule group.

\* \* \* \* \*